US012705884B2

(12) United States Patent
Doken

(10) Patent No.: US 12,705,884 B2
(45) Date of Patent: Aug. 11, 2026

(54) SMART HOME MANAGEMENT SYSTEM FOR GENERATING AUGMENTED REALITY SCENE OF POTENTIALLY HAZARDOUS CONDITION

(71) Applicant: Adeia Guides Inc., San Jose, CA (US)

(72) Inventor: Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/632,050

(22) Filed: Apr. 10, 2024

(65) Prior Publication Data

US 2024/0257516 A1 Aug. 1, 2024

Related U.S. Application Data

(63) Continuation of application No. 17/585,778, filed on Jan. 27, 2022, now Pat. No. 11,983,922.

(51) Int. Cl.

| | |
|---|---|
| ***G06V 20/20*** | (2022.01) |
| ***G06T 11/00*** | (2006.01) |
| ***G06V 20/52*** | (2022.01) |
| ***G06V 40/10*** | (2022.01) |

(52) U.S. Cl.

CPC .............. *G06V 20/20* (2022.01); *G06T 11/00* (2013.01); *G06V 20/52* (2022.01); *G06V 40/10* (2022.01)

(58) Field of Classification Search

CPC ........ G06V 20/20; G06V 20/52; G06V 40/10; G06T 11/00

USPC .......................................................... 345/633

See application file for complete search history.

(56) References Cited

U.S. PATENT DOCUMENTS

| | | | |
|---|---|---|---|
| 8,953,841 | B1 | 2/2015 | Leblang et al. |
| 10,043,376 | B1 | 8/2018 | Poornachandran et al. |
| 10,832,484 | B1 | 11/2020 | Silverstein et al. |
| 2013/0293586 | A1 | 11/2013 | Kaino et al. |
| 2016/0070991 | A1 | 3/2016 | Galera et al. |
| 2017/0024986 | A1 | 1/2017 | Austin |
| 2017/0089710 | A1 | 3/2017 | Slusar |

(Continued)

FOREIGN PATENT DOCUMENTS

| | | |
|---|---|---|
| CN | 107045623 | 8/2017 |
| GB | 2578133 A | 4/2020 |

OTHER PUBLICATIONS

"Teaching AI to perceive the world through your eyes," https://ai.facebook.com/blog/teaching-ai-to-perceive-the-world-through-your-eyes/, Oct. 14, 2021 (13 pages).

(Continued)

*Primary Examiner* — Jin Ge

(74) *Attorney, Agent, or Firm* — HG LAW LLP

(57) ABSTRACT

Systems and methods are described for identifying, using a sensor, a location of an object in an environment, and determining a classification of the object. A human may be identified in proximity with the object, an identity of the human may be determined, and a determination may be made that a hazardous condition may occur, based on a combination of the location of the object, the classification of the object, and the identity of the human in proximity with the object. In response to determining that the hazardous condition may occur, an augmented reality scene associated with the potentially hazardous condition associated with the object may be generated for presentation, at a user device.

20 Claims, 14 Drawing Sheets

(56) References Cited

U.S. PATENT DOCUMENTS

| | | | | |
|---|---|---|---|---|
| 2017/0323481 | A1* | 11/2017 | Tran | H04N 23/611 |
| 2018/0052294 | A1 | 2/2018 | Qiao | |
| 2019/0221035 | A1* | 7/2019 | Clark | A63F 13/5255 |
| 2019/0281153 | A1 | 9/2019 | Merjanian et al. | |
| 2019/0362611 | A1 | 11/2019 | Myers et al. | |
| 2019/0384976 | A1 | 12/2019 | Lee | |
| 2020/0026922 | A1 | 1/2020 | Pekelny et al. | |
| 2020/0258278 | A1* | 8/2020 | Mirhosseini | G06F 3/011 |
| 2021/0374391 | A1 | 12/2021 | Jorasch et al. | |
| 2023/0080909 | A1 | 3/2023 | Tomczek | |
| 2023/0087963 | A1 | 3/2023 | Doken et al. | |
| 2023/0098451 | A1* | 3/2023 | Brown | B62J 45/20 701/93 |
| 2023/0196681 | A1* | 6/2023 | Madden | G08B 21/02 345/419 |
| 2023/0237797 | A1 | 7/2023 | Doken | |

OTHER PUBLICATIONS

Goldstein, “How AR Firefighting Masks Improve Situational Awareness,” How AR Firefighting Masks are Helping Fight Fires—StateTech Magazine Nov. 21, 2019 (9 pages).

* cited by examiner 208
203
204
200
201
206
116
112
102
202

601

| User 602 | Vulnerable User 604 | Associated Device 606 |
|---|---|---|
| Male Adult 1 | No | Smart Glasses |
| Female Adult 1 | No | Smart Phone |
| Teenager 1 | Yes | Smart Watch |
| Toddler 1 | Yes | Wearable Camera |
| Elderly Male 1 | Yes | Wearable Camera |

603

| Hazardous Object 608 | Vulnerable User Warning 610 | Non Vulnerable User Warning 612 | Non Vulnerable User Remote Warnings 614 |
|---|---|---|---|
| Close Proximity | No | No | Yes |
| In Field of View | Yes | No | Yes |
| Object in Hazardous Situation | Yes | Yes | Yes |

605

| Potential Accident 616 | Hazard Object 1 618 | Hazard Object 2 620 |
|---|---|---|
| Cuts | Knife | Broken Glass |
| Choking | Small Toy | Seeds, Pits |
| Burn | Stove | Hot Water Tap |
| Trip | Cord | Blinds |
| Falling Object | Tablecloth Edge | Dish Towel |
| Cuts | Knife | Broken Glass |
| Falling Object | Unsecured Mirror | Drawer |
| Fire | Bleach | Stove |
| Fire | Wine | Stove |

FIG. 6

808
Determination whether to provide warning
800
Machine Learning Model
802
Current conditions of environment
804
Training data set of historical hazardous conditions

SMART HOME MANAGEMENT SYSTEM FOR GENERATING AUGMENTED REALITY SCENE OF POTENTIALLY HAZARDOUS CONDITION

CROSS-REFERENCE TO RELATED APPLICATION

This application is a continuation of U.S. patent application Ser. No. 17/585,778, filed Jan. 27, 2022, the disclosure of which is hereby incorporated by reference herein in its entirety.

BACKGROUND

This disclosure is directed to systems and methods for providing augmented reality warnings regarding conditions hazardous to a user. In particular, techniques are disclosed for, in response to determining that a hazardous condition may occur, generating for presentation, at a user device, an augmented reality scene associated with the potentially hazardous condition associated with an object in an environment.

SUMMARY

Every year, more than 160,000 Americans die because of an accident, making accidents the third biggest cause of death across the country during a typical year. In particular, unintentional household injury makes up 75% of those deaths, and according to the United States Centers for Disease Control and Prevention (CDC), approximately 12,000 children and young adults, ages 1 to 19 years, die from unintentional injuries each year. For each person who dies from an injury, there are 13 that are hospitalized and 129 that seek treatment in an emergency room. Males are almost twice as likely to die from an injury-related accident as females, and the total cost of home-based injuries is $221 billion each year. Many Americans may struggle to avoid or prevent household injuries for various reasons, e.g., a lack of knowledge and/or experience, cognitive decline due to age, unsecured conditions, cognitive load due to busy lives, schedules and a lot of family responsibilities, etc. While some hazardous conditions may be spotted by home inspectors at the time of home purchase, such conditions are often not addressed, and such safety inspections generally are not performed again for decades. Moreover, dynamic conditions materialize every day based on items and persons in a household or other environment constantly changing, infinitely increasing hazard potentials which may eventually yield accidents.

In one approach, computing techniques may be used to equip emergency personnel (i.e., firefighters) with a thermal camera and augmented reality device that highlights objects in the field of view of the firefighter, such as in a smoke-filled building that the firefighter enters in a rescue effort. While such an approach may be useful in assisting emergency personnel in a scenario in which an emergency is occurring, it may be less useful in preventing accidents or notifying users of hazardous conditions in everyday life. For example, if a user were constantly provided with warnings or indications of objects while walking through his or her house, the user may be likely to become bothered and annoyed and may begin to ignore the warnings or indications or turn off the service that provides the warnings or indications, which may frustrate the ability of such a service to prevent household injuries and accidents.

To overcome these problems, systems and methods are provided herein for a smart home management system (SHMS) configured to identify, using a sensor, a location of an object in an environment, and determine a classification of the object. The SHMS may identify a human in proximity to the object, and determine an identity of the human. The SHMS may determine that a hazardous condition may occur, based on a combination of the location of the object, the classification of the object, and the identity of the human in proximity to the object. In response to determining that the hazardous condition may occur, an augmented reality scene associated with the potentially hazardous condition associated to the object may be generated for presentation at a user device.

Such aspects enable selectively providing an augmented reality warning associated with a potentially hazardous conditions (e.g., within, outside, and/or around a household or a business), e.g., at times where the SHMS identifies potential or imminent hazards that may or are about to happen. Although it may be impossible to prevent all accidents, the SHMS may perform predictive analysis to provide warnings ahead of time to potentially reduce the number of and frequency of accidents, and such warnings may be selectively or sparingly provided to avoid annoying the user, while at the same providing the warning when it may be useful for the user. In some embodiments, the SHMS may scan the environment (e.g., business or home) to generate a 3D Map of the environment to create an augmented reality (AR) home cloud, and the AR home cloud may map one or more objects detected within the environment to specific locations. Such initial scanning may establish a baseline and may be performed via a variety of devices, e.g., a smart phone, tablet or a smart glass, or any other suitable device or any combination thereof, equipped with a camera, or any other suitable sensor or any combination thereof. In some embodiments, once complete, the SHMS may store a list of the detected objects and corresponding classifications indicative of whether the object may cause or be involved in an accident, its respective location including its current coordinates in 3D space, e.g., stored in the AR home cloud, orientation of the object, orientation information of the condition that may potentially may cause a hazard, or any other suitable information, or any combination thereof. Such stored information may be employed in providing AR warnings to the user regarding potentially hazardous conditions.

In some aspects of this disclosure, determining the identity of the human comprises identifying a characteristic of the identified human, and determining that the hazardous condition may occur, based on the combination, comprises determining that a database stores an indication that the combination of the identified characteristic and the object is indicative that the hazardous condition may occur. In some embodiments, the characteristic corresponds to one or more of an age of the human, and a level of distraction of the human.

In some embodiments, the user device is associated with a user different from the identified human, and/or the user device is associated with the identified human. In some embodiments, the provided systems and methods further comprise determining that a weather event is associated with the environment, and determining that the hazardous condition may occur based at least in part of the determined weather event.

In some aspects of this disclosure, the augmented reality scene comprises one or more of an indication of an accident that may occur as a result of the potentially hazardous condition, or a recommendation of a corrective action to ameliorate the potentially hazardous condition.

In some embodiments, determining that the hazardous condition may occur further comprises determining that the object is in proximity to an additional object, and determining that a database stores an indication that the object being in proximity to the additional object is indicative that the hazardous condition may occur.

In some aspects of this disclosure, the SHMS is further configured to receive input to mark an object as being associated with a potentially hazardous condition, and cause a database to store an indication that the marked object is associated with a potentially hazardous condition.

In some embodiments, the SHMS is further configured to generate a plurality of user profiles, wherein at least one of the user profiles is associated with a respective user device, and identifying the human in proximity with the object comprises determining a current location in the environment of the user device associated with a user profile of the human, and determining that the current location in the environment of the user device associated with the user profile is proximate to the object associated with the potentially hazardous condition.

In some aspects of this disclosure, generating for presentation, at the user device, the augmented reality scene further comprises activating a camera of the user device in response to determining that the current location in the environment of the user device associated with the user profile is proximate to the object associated with the potentially hazardous condition, and capturing, using the camera, an image of the object, and enhancing the image of the object with an augmented reality effect to render the augmented reality scene.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 6 shows illustrative data structures, in accordance with some embodiments of this disclosure.

DETAILED DESCRIPTION

Figure 1:
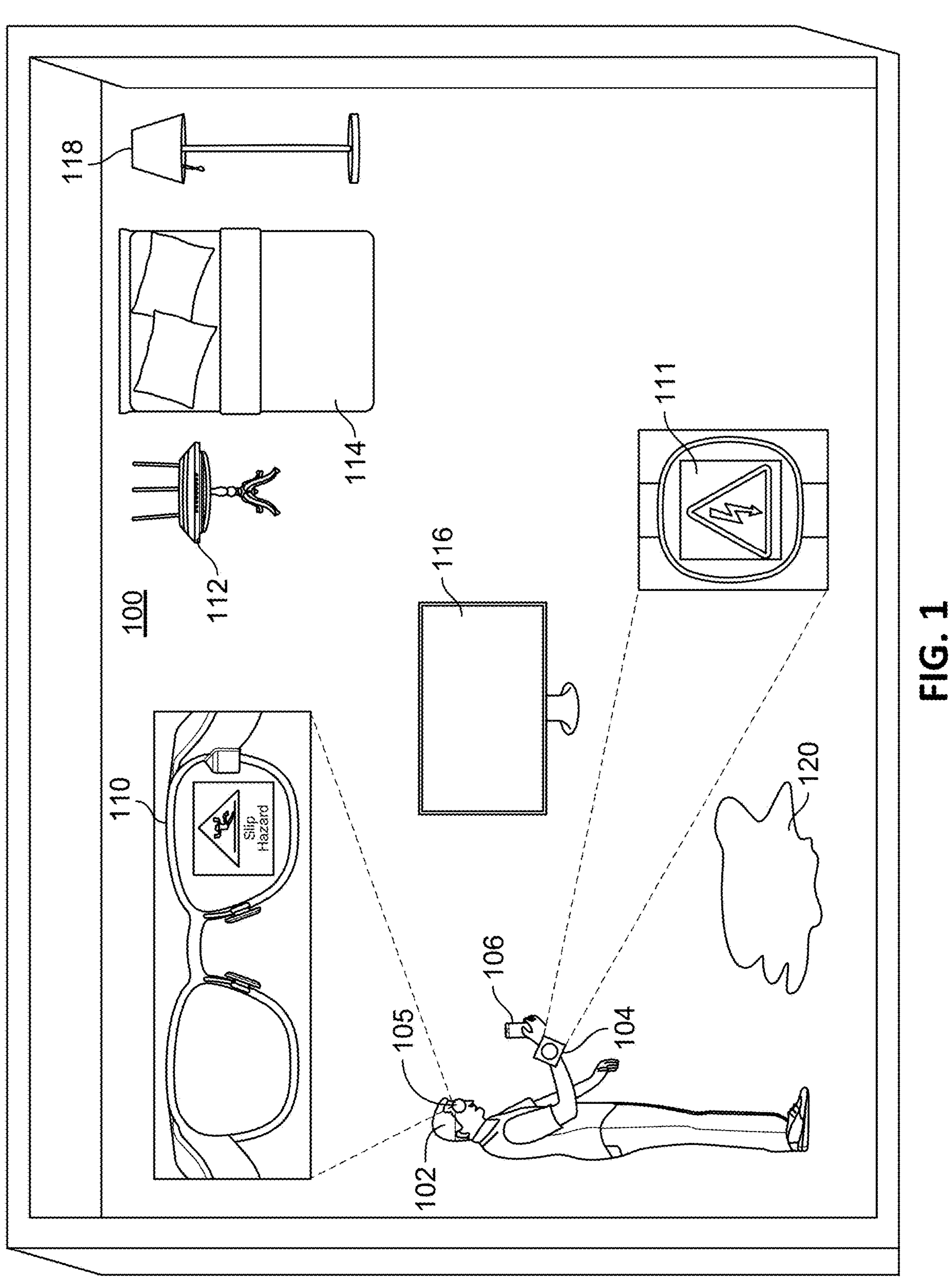
FIG. 1 shows an illustrative scenario in which an augmented reality scene associated with a potentially hazardous condition and associated with an object may be provided to a user, in accordance with some embodiments of this disclosure.

FIG. 1 shows an illustrative environment in which an augmented reality scene associated with a potentially hazardous condition and associated with an object may be provided to a user, in accordance with some embodiments of this disclosure. Environment 100 may be a particular physical location (e.g., a household of user 102, a park or playground, a place of business, a school, other organization, or any other suitable location, or any combination thereof). Environment 100 may comprise any suitable number and types of objects. As referred to herein, the term "object" should be understood to refer to any item or component thereof, any structure or portion thereof, and may include a particular state or condition of (or event or task associated with) the item or component thereof, or a particular state or condition of (or event or task associated with) the structure or portion thereof, or any other suitable observable entity or attribute thereof in an environment, or any combination thereof. In some embodiments, an object may be permanent or have a longer presence (e.g., furniture, a wall, a ceiling, a swimming pool, a tree, or any other suitable object, or any combination thereof) or may have a shorter presence (e.g., a puddle, a leak, broken glass, or any other suitable object, or any combination thereof). For example, environment 100 may be a household of user 102 comprising networking equipment 112, bed 114, television 116, lamp 118 and puddle 120.

In some embodiments, a smart home management system (SHMS) may be configured to identify locations of one or more objects in environment 100 and determine respective classifications of the identified one or more objects. The SHMS may be implemented at one or more of server 1004 of FIG. 10, user device 900, 901 of FIG. 9 and/or user device 1008, 1008, 1009 of FIG. 10, or distributed across one or more of any other suitable device, or any combination thereof.

The SHMS may utilize any suitable number and types of sensors to determine information related to the objects in environment 100, e.g., an image sensor, ultrasonic sensor, radar sensor, LED sensor, LIDAR sensor, or any other suitable sensor, or any combination thereof, to detect and classify objects in environment 100. For example, the SHMS may comprise an application running at least in part on a user device (e.g., mobile device 106, smart watch or wearable device 104, smart glasses 105, a wearable camera, a smartphone, a tablet, AR glasses, AR head-mounted display (HMD), virtual reality (VR) HMD or any other suitable user device, or any combination thereof), and the SHMS may utilize any combination of sensors provided by the user device to identify objects (e.g., networking equipment 112, bed 114, television 116, lamp 118 and puddle 120, or any other suitable objects or any combination thereof). In some embodiments, the SHMS may request user 102 to perform a walkthrough (e.g., during an initial setup of the SHMS) with his or her user device, to scan and map objects of environment 100 based on sensor data captured by, e.g., user device 104 or 106, or any other suitable sensor, or any combination thereof. In some embodiments, the mapping may be performed by a home inspector, e.g., at the request of a prospective buyer of a house including environment 100. For example, the SHMS may instruct the user to point a camera and/or light source at various points in environment 100 to build a map of environment 100, e.g., a three-dimensional mapping. In some embodiments, the SHMS may provide user 102 with the option to turn on user device 104, 105 and/or 106 at any time (e.g., by invoking an always-on mode, or at any suitable particular times), to obtain information for mapping environment 100, e.g., to generate a three-dimensional map of environment 100. For example, one or more sensors of user device 104 may be used to ascertain a location of an object by outputting a light or radio wave signal, and measuring a time for a return signal to be detected and/or measuring an intensity of the returned signal, and/or performing image processing on images captured by the image sensor of environment 100. In some embodiments, the SHMS may be configured to receive input from user 102 identifying a location and/or classification of a particular object.

In some embodiments, one or more devices and/or one or more objects in environment 100 may be configured to communicate wirelessly. For example, lamp 118, or any other suitable object, may be an Internet of Things (IoT) device equipped with sensors (e.g., a camera or image sensor, a microphone, or any other suitable sensors or any combination thereof) or other circuitry (e.g., wireless communication circuitry) to indicate to the SHMS a location of object 118 within environment 100 and/or an indication that object 118 is of a particular type (e.g., a lamp or any other suitable household appliance). For example, such IoT devices may communicate with the SHMS via the Internet or directly, e.g., via short-range wireless communication or a wired connection, such as, for example, by transmitting identifiers indicative of a type of the object (e.g., whether the device is a chair, table, robot vacuum, exercise equipment, thermostat, security camera, lighting system, dishwasher, or any other suitable device, or any combination thereof) and/or an orientation and location of the object. Based on such received identifiers, the SHMS may monitor and keep track of one or more objects in environment 100.

In some embodiments, user device 104, user device 105, user device 106, networking equipment 112 (e.g., a router, a modem, a switch, an access point, or any other suitable device or any combination thereof), and/or any suitable IOT device (e.g., bed 114, lamp 118, or any other suitable object or device), or any other suitable device or object or any combination thereof, may be equipped with antennas for transmitting and receiving electromagnetic signals at frequencies within the electromagnetic spectrum, e.g., radio frequencies, to communicate with each other over a network in a localized area. The network may correspond to, e.g., a Wi-Fi network, such as, for example, 802.11n, 802.11ac, 802.11ax, or Wi-Gig/802.11ad, or any other suitable network, or any combination thereof. The devices or objects of environment 100 may communicate wirelessly over a wireless local area network (WLAN) and with the Internet, and may be present within an effective coverage area of the localized network, e.g., a home network or enterprise network. The Internet may include a global system of interconnected computer networks and devices employing common communication protocols, e.g., the transmission control protocol (TCP), user datagram protocol (UDP) and the internet protocol (IP) in the TCP/IP internet protocol suite. In some embodiments, the objects and devices of environment 100 may communicate via a short-range wired or wireless communication technique (e.g., Bluetooth, RFID, NFC, or any other suitable technique, or any combination thereof). In some embodiments, the SHMS may identify classifications and/or locations of objects in environment 100 based on determined wireless signal characteristics, e.g., channel state information (CSI), received signal strength indicator (RSSI) and/or received channel power indicator (RCPI), as discussed in more detail in Doken et al., application Ser. No. 17/481,931, the contents of which are hereby incorporated by reference herein in their entirety.

In some embodiments, the SHMS may utilize any suitable number or types of image processing techniques (e.g., object recognition, pattern recognition, facial recognition, edge detection, computer vision, or any other suitable technique or any combination thereof) to identify objects depicted in images captured by one or more cameras of user device 104, 105 and/or 106. For example, the SHMS may extract one or more features for a particular object, and compare the extracted features to those stored locally and/or at a database or server storing features of objects and corresponding classifications of objects. For example, if dimensions, shape, color, or any other suitable information, or any combination thereof, is extracted from one or more images of lamp 118, the SHMS may determine that object 118 corresponds to a lamp (and/or a particular type of lamp) based on a similarity between the extracted information and stored information. In some embodiments, a Cartesian coordinate plane is used to identify a position of an object in environment 100, with the position recorded as (X, Y) coordinates on the plane. In some embodiments, the coordinates may include a coordinate in the Z-axis, to identify the position of each identified object in 3D space, based on images captured using 3D sensors and any other suitable depth-sensing technology. In some embodiments, coordinates may be normalized to allow for comparison to coordinates stored at the database in association with corresponding objects. As an example, the SHMS may specify that an origin of the coordinate system is considered to be a corner of a room within or corresponding to environment 100, and the position of the object may correspond to the coordinates of the center of the object or one or more other portions of the object.

In some embodiments, the SHMS may utilize one or more machine learning models to localize and/or classify objects in environment 100. For example, the machine learning model may output a value, a vector, a range of values, any suitable numeric representation of classifications of objects, or any combination thereof. The machine learning model may output one or more classifications and associated confidence values, where the classifications may be any categories into which objects may be classified or characterized. Various machine learning models (e.g., naive Bayes algorithm, logistic regression, recurrent neural network, bidirectional long short-term memory recurrent neural network model (LSTM-RNN), or any other suitable model, or any combination thereof) may be used to classify objects. In some embodiments, the model may be trained on a plurality of labeled image pairs, where image data may be preprocessed and represented as feature vectors.

Figures 4, 5:
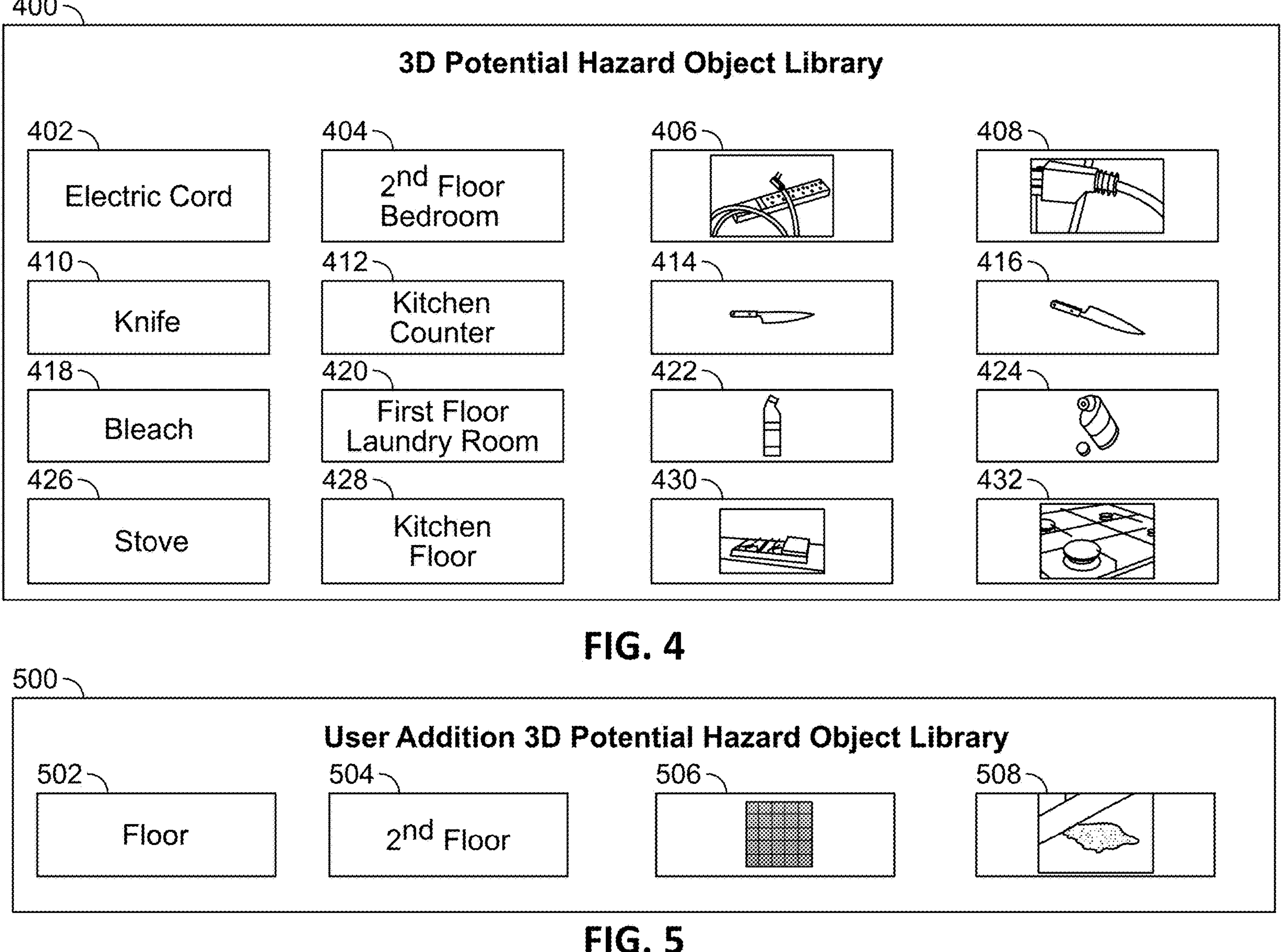
FIG. 4 shows an illustrative data structure, in accordance with some embodiments of this disclosure.
FIG. 5 shows an illustrative data structure, in accordance with some embodiments of this disclosure.

Based on the above-mentioned techniques, or any other suitable techniques, the SHMS may build an inventory of objects (e.g., indications of locations and corresponding classifications of household items, or any other suitable objects, or any combination thereof) and corresponding locations of the objects in environment 100, which may be stored in association with, e.g., one or more of the data structures of FIGS. 4-6. In some embodiments, the SHMS may generate a data structure for a current field of view of the user, including object identifiers associated with objects in environment 100, and such data structure may include coordinates representing the position of the field of view and objects in environment 100. A field of view may be understood as a portion of environment 100 that is presented to user 102 at a given time via a display (e.g., an angle in a 360-degree sphere environment) when the user is at a particular location in environment 100 and has oriented a user device in a particular direction in environment 100. The field of view may comprise a pair of 2D images to create a stereoscopic view in the case of a VR device; in the case of an AR device (e.g., smart glasses), the field of view may comprise 3D or 2D images, which may include a mix of real objects and virtual objects overlaid on top of the real objects using the AR device (e.g., for smart glasses, a picture captured with a camera and content added by the smart glasses).

In some embodiments, the SHMS may be configured to maintain and store registered user accounts and/or profiles. For example, user 102 may be associated with a particular user account or profile with the SHMS, accessible via any number of user devices at which the user provides his or her credentials, and from any number of different locations. The SHMS may monitor and store any suitable type of user information associated with user 102, and may reference the particular user profile or account to determine an identity of a human (e.g., user 102) in environment 100. The user profile or account may include user information input by the user, e.g., characteristics of the user, such as gender, age, height, weight, interests, or any other suitable user information, or any combination thereof, and/or user information gleaned from monitoring a condition of the user or other activities of the user, e.g., current and/or historical biometric data of the user, facial or voice characteristics of the user, historical actions or behaviors of the user, user interactions with websites or applications (e.g., social media, or any other suitable website or application, or any combination thereof) or purchase history, or any other suitable user information, or any combination thereof. In some embodiments, the user profile or account may include user information related to cognitive and/or physical capabilities or limitations, e.g., literacy, language(s) understood, hearing or vision impairments, mobility issues, etc. In some embodiments, if a human is detected in environment 100 but the SHMS is not able to identify a particular user profile or account associated with the detected human, biometric data or facial recognition techniques may be employed to determine whether the user is frequently located in environment 100 (e.g., lives at a house corresponding to environment 100) or is a guest that perhaps does not frequently visit environment 100 (or frequently visits environment 100). In some embodiments, certain devices may be associated with a particular user device or user account, e.g., device identifiers for one or more of user devices 104, 105, 106 may be stored in association with a user profile of user 102.

In the example of FIG. 1, the SHMS may determine that a user profile or account associated with user 102 is logged in one or more of user device 104, user device 105 and user device 106. In some embodiments, even if a user is not logged in, the SHMS may determine an identity of the user based on monitored characteristics of a human detected in environment 100 (e.g., the appearance of the user, voice characteristics of the user, or any other suitable characteristics or any combination thereof). In some embodiments, the SHMS may determine that a human (e.g., user 102) is in proximity to one or more of objects 112, 114, 118, 120 based on one or more of such objects being in a field of view of a camera of one or more of user device 104, user device 105 and user device 106. In some embodiments, the SHMS may determine a current location of user 102 within environment 100 based on any suitable technique, e.g., wireless signal characteristics of one or more of the user devices and/or networking equipment 112, sensor data (e.g., captured images by one or more of the user devices or one or more cameras positioned at various locations in environment 100; audio signals captured by a microphone of a user device, IoT device or home assistant and indicating a location of a user; or any other suitable sensor data or any combination thereof), or any other suitable technique or any combination thereof. In some embodiments, the SHMS may determine that user 102 is in proximity to one or more of objects 112, 114, 118, 120 based on comparing the current location of user 102 to the stored location of each respective object. For example, user 102 may be considered in proximity to an object if the comparison indicates that the location of user 102 and one of the objects is the same or is within a threshold distance (e.g., five feet, or any other suitable distance, or any combination thereof). In some embodiments, the SHMS may track the movements of the user with, e.g., gyroscopes, accelerometers, cameras, etc., in combination with control circuitry.

In some embodiments, the threshold for proximity may vary based on a type of identified object. For example, an object posing a relatively higher risk to user 102 may be associated with a greater threshold distance and an object posing a relatively lower risk to user 102 may be associated with a lower threshold distance, to give user 102 more time to react to a warning associated with the object posing a relatively higher risk to user 102. As another example, characteristics of the user may impact a proximity threshold set by the SHMS. For example, the SHMS detecting a toddler being within the same room as an identified object (e.g., a knife) may trigger a warning to parents of the toddler and/or the toddler, whereas the SHMS detecting an adult, such as user 102, may set a lower proximity threshold (e.g., do not provide a warning until the user is within five feet of the identified object).

The SHMS may determine that user 102 is in proximity to object 120, and may determine or retrieve information indicating that object 120 corresponds to a puddle. In some embodiments, the SHMS may additionally or alternatively determine or retrieve information indicating that the identified human, user 102, is an adult user, e.g., based on the user profile or account associated with user 102, or based on captured sensor data. The SHMS may determine that a hazardous condition may occur, based on a location of object 120, a classification of the identified object as a puddle, the identity of the human (e.g., user 102) in proximity with the identified object 120, or based on any other suitable factor, or any combination thereof. For example, the SHMS may determine the hazardous condition based at least in part on a slip hazard if user 102 steps in puddle 120, and/or an electric shock hazard (e.g., if an electric chord or other electric-powered item is in proximity to puddle 120) associated with puddle 120.

In some embodiments, the SHMS may in response to determining that the potentially hazardous condition may occur, generate for presentation, at a user device (e.g., at least one of user device 104, 105, 106 or any other suitable device or any combination thereof), an indication associated with the potentially hazardous condition that may occur. For example, the SHMS may generate for presentation, at user device 105, an augmented reality scene associated with the potentially hazardous condition associated with identified object 120. Augmented reality enables a user to view supplemental content superimposed onto an image or view of the real world, e.g., the supplemental content may be overlaid on top of the real-world image so as to appear to be part of the real-world image displayed on a mobile device, or the supplemental content may be displayed in a portion of a display (e.g., of smart glasses 105) where the user may otherwise see a part of the real world. In some embodiments, the SHMS may map interactive virtual objects to the real world in the augmented reality or mixed reality scene.

Such augmented reality scene may from the perspective of user 102, depict indication 110 of a slip hazard augmenting (e.g., overlaid on, or in proximity to) puddle 120. Indication 110 may be a slip-and-fall warning, and/or may be presented at one, or both, lenses of smart glasses 105. In some embodiments, the augmented reality scene may comprise augmenting live video or other live-captured moving image, three-dimensional image, panoramic or other immersive image (e.g., a 360-degree image or series of live images surrounding a particular viewpoint), live VR or AR renderings, an image received from a content source, and/or any other visual media or any combination thereof. In some embodiments, the SHMS may provide to a user device an indication of corrective action that could be taken, e.g., to clean up or avoid walking through puddle 120, to ameliorate the potentially hazardous condition. Such indication may show an image or video indicating how to perform the corrective action and/or an end result of performing the corrective action, and such image or video may augment a real-world view of environment 100. Additionally or alternatively, the SHMS may provide, at one or more of user devices 104, 105, 106 (or via any other suitable device, or any combination thereof), any suitable indications in any suitable form (e.g., audio, tactile, visual, or any other suitable form, or any combination thereof) associated with the potentially hazardous condition associated with the identified object.

In some embodiments, the indication of how an accident may occur can come from any suitable source. For example, the SHMS may record multimedia data (video and/or audio, or any other suitable data, or any combination thereof) of a previous or historical accident that already happened in environment 110, or multimedia data of a previous or historical accident that occurred in other environments (e.g., other homes or other environments, such as, for example, that are of a same type of environment as environment 100). The SHMS may pull such data from a cloud/knowledge base system, e.g., server 1004 and/or database 1005 and/or any other suitable data storage or any combination thereof. Such features may enable users living or frequently present in environment 100 to be reminded of a past accident or hazardous condition that should be avoided, as well as to enable guests visiting environment 100 to be precisely warned to historical accidents, since they may not be familiar with the location and/or objects associated with the potentially hazardous location. For example, certain potentially hazardous conditions may be unique to a particular layout and/or combination of objects within environment 100, and thus it may be particularly beneficial to warn guests of such potentially hazardous conditions give their likely unfamiliarity with such conditions.

In some embodiments, the SHMS may activate a camera of a user device (e.g., at least one of user device 104, 105, 106) in response to determining that a current location in the environment of the user device associated with the user profile of user 102 is proximate to the identified object associated with the potentially hazardous condition. For example, the SHMS may determine from another device (e.g., based on wireless signal characteristics in environment 100 or based on images captured by a security camera, or any other suitable technique or any combination thereof) that user 102 is approaching puddle 120, and in response may cause a camera of a user device of user 102 to be activated and capture an image in the field of view of user 102, including puddle 120. The SHMS image may cause such image to be enhanced with an augmented reality effect (e.g., indication 110 or any other suitable augmented reality effect) to render the augmented reality scene.

In some embodiments, the SHMS may determine that a hazardous condition may occur based on the proximity of at least two objects to each other. Such determination may be made regardless of whether user 102 is in proximity to the objects. For example, the SHMS may employ an if this then that (IFTTT) database or data structure, or any other suitable technique. The IFTTT database may be queried with at least two objects to determine whether a potentially hazardous condition is present in environment 100. As an example, the SHMS may determine that, based on the proximity of television 116 to puddle 120, there is a potential risk of an electrical accident or electrical shock to user 102 if puddle 120 were to expand or otherwise contact television 116. In response to such a determination, the SHMS may provide indication 111 at user device 104 (and/or any other suitable user device) indicating the risk of an electrical accident or shock to user 102. Indication 111 may be provided to augment the real-world view of puddle 120 and/or television 116. In some embodiments, the SHMS may provide to a user device an indication of corrective action that could be taken, e.g., to move the television away from puddle 120, or clean up or avoid walking through puddle 120. Such indication may show an image or video indicating how to perform the corrective action and/or an end result of performing the corrective action, and such image or video may augment a real-world view of environment 100. It should be appreciated that the IFTTT database may store any suitable number of combinations of objects associated with potentially hazardous conditions (e.g., a hair dryer being too close to a bathtub, proximity of dangerously reactive liquids or solids, or any other suitable object combinations, or any combination thereof). In some embodiments, user 102 may be permitted to remove or override a determination by the SHMS of one or more objects as being associated with a potentially hazardous condition, and/or mark one or more objects as being associated with a potentially hazardous condition. In some embodiments, the SHMS may provide the user with a temporary override option (e.g., to suspend warning for a particular object or class of objects during a particular user session or time period), or a permanent override option, e.g., an option such as "Never warn me again" with respect to a particular object or class of objects.

In some embodiments, if a particular situation is determined by the SHMS to be a high severity level (e.g., an electric appliance or chord near puddle 120, or any other suitable scenario deemed to be of high severity level) the SHMS may pre-emptively take action to shut down the power for the particular room (e.g., the location of the vulnerable user) or even the entire environment (e.g., the whole house, or the majority of the house or any other suitable environment) to help avoid or prevent an impending accident. In some embodiments, the SHMS may receive permission from the user to perform such actions. In some embodiments, the SHMS may cause certain devices (e.g., an autonomous vacuum cleaner, or any other suitable devices) to cease operation or avoid a certain area containing puddle 120, to avoid an electric accident and/or damage to the device. For example, the SHMS may be operable to communicate with and instruct (e.g., over a home network) the autonomous vacuum cleaner to modify its operation.

In some embodiments, the SHMS may determine a level of vulnerability of the user, and may take such level of vulnerability into account when determining whether a particular scenario constitutes a potentially hazardous household condition to the user. For example, the SHMS may reference the user profile of a particular, user which may store demographic data and/or biometric data and/or any suitable user information indicative of a current state of user 102, and/or identify characteristics of the user based on real-time observations via one or more sensors. For example, if the SHMS determines that a first user is elderly (or is child) and/or physically unfit (e.g., having mobility issues, hearing or vision impairments, etc.), and/or cognitively in decline, and/or in an angry or stressed-out state, the SHMS may be more likely to determine that a particular scenario poses a larger risk to the first user as compared to a second user who is relatively young and/or physically fit and/or in a good mood, since the first user may be more distracted or disoriented or otherwise less able to avoid the potentially hazardous condition as compared to the second user. In some embodiments, the SHMS may assign certain weights to certain vulnerability states, which may be used in determining whether to present an augmented reality scene associated with the potentially hazardous condition, and/or a manner in which to present the scene. For example, the first user in the example above, determined by the SHMS to be more vulnerable, may be presented a more urgent alert than the second user, determined by the SHMS to less vulnerable. In some embodiments, a manner of outputting an alert may depend on cognitive and/or physical capabilities/limitations indicated in a user profile, e.g., providing the alert in a language that matches a language understood by a particular user as indicated in the user's profile, providing audio-based or image-based alerts in favor of text if a user has a low literacy level as indicated in the user's profile, etc.

In some embodiments, the SHMS may determine that a particular user is stressed based on any suitable factor (e.g., upon detecting the user worked more hours than normal that day at his or her job, based on the user's email or call history or a log of computing tasks performed, or any other suitable factor). In some embodiments, a distraction level of a user may be based on any suitable factor, e.g., a level of physical exertion for a current activity being performed by the user may be taken into account by the SHMS. For example, if user 102 is determined by the SHMS to be on a telephone call while near an oven that is in operation, or user 102 is determined by the SHMS to be climbing the stairs, the SHMS may determine that user 102 is distracted, and may provide a warning regarding a potentially hazardous condition based on this determination, even if user 102 may not otherwise be provided a warning in the same situation if not distracted. In some embodiments, a guest who does not know the environment particularly well may be considered to be a vulnerable user.

In some embodiments, the SHMS may take into account environmental conditions related to weather events and geological hazard (geohazard) zones. For example, the SHMS may determine (e.g., based on information received from a weather service or any other suitable service or device) environment 100 is in an area at risk (e.g., currently or generally) of earthquakes, hurricanes, tornados, volcanic eruptions, landslides, floods, avalanches, thunderstorms, sand blasting, or any other environmental risk or any combination thereof. Some weather-related events may include a forecast of an approaching storm that could cause flooding, a high-wind event, a "Red Flag Warning" related to fire risk, or any other suitable indication, or any combination thereof. Such aspects may be used in determining that a hazardous condition may occur. For example, if there is an impending thunderstorm or tornado, the SHMS may provide AR warnings regarding going outside or going too close to window or using certain electronic devices, and/or provide suggestions to move to a certain area of the environment, e.g., a basement or storm shelter.

Figure 2:
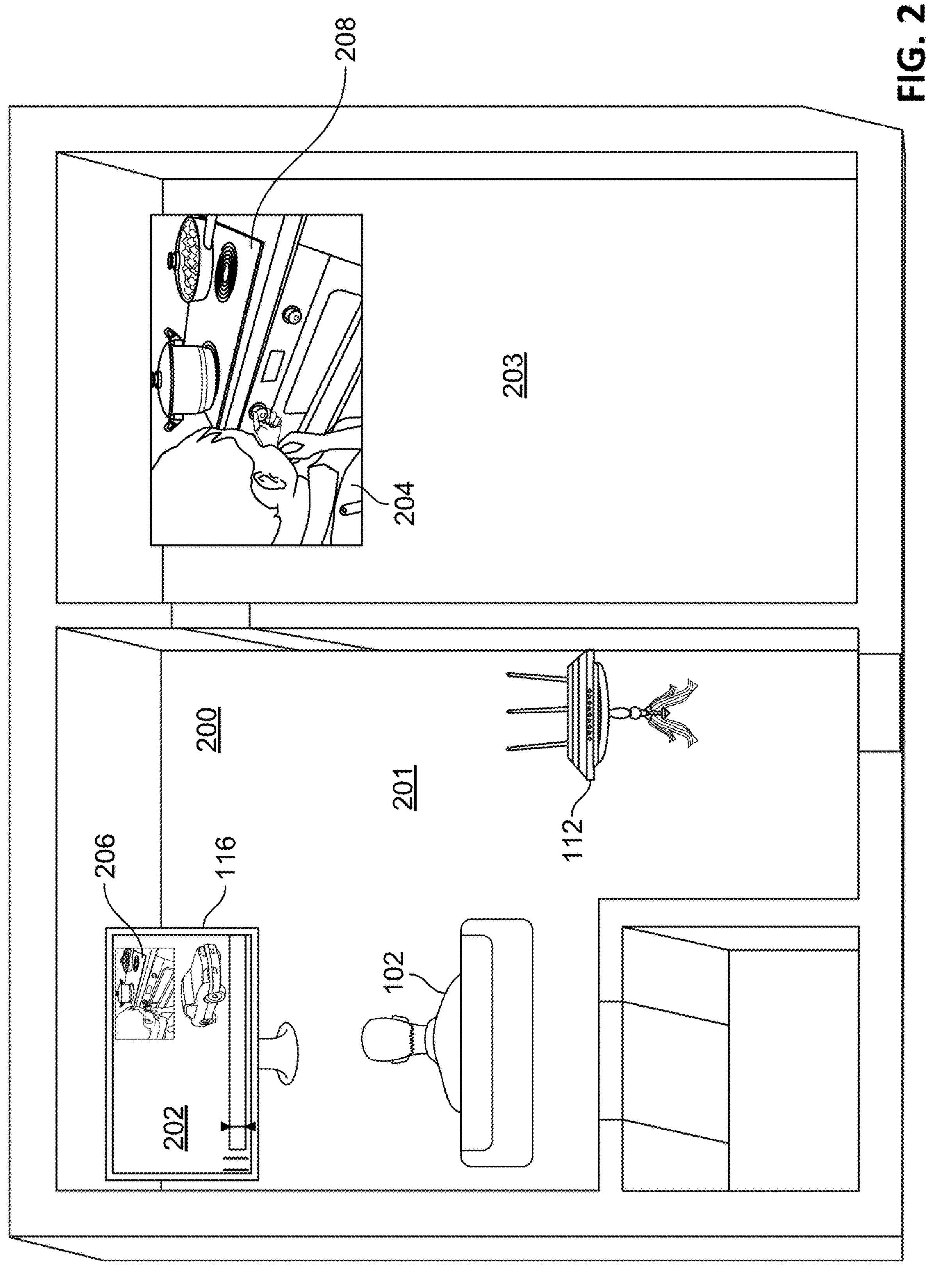
FIG. 2 shows an illustrative scenario in which an augmented reality scene associated with a potentially hazardous condition and associated with an object may be provided to a user, in accordance with some embodiments of this disclosure.

FIG. 2 shows an illustrative scenario in which an augmented reality scene associated with a potentially hazardous condition and associated with an identified object may be provided to a user, in accordance with some embodiments of this disclosure. Environment 200 may comprise a first room 201 (e.g., a living room, or any other suitable room, or any combination thereof) and a second room 203 (e.g., a kitchen, or any other suitable room, or any combination thereof) and any other suitable number and types of rooms or sub-environments. Media asset 202 may be generated for presentation at television 116 for consumption by user 102 in room 201, while a user 204 (e.g., a child or toddler, an elderly human, or other vulnerable user) is present in kitchen 203 near an object (e.g., stove or oven, or any object that poses a potentially hazardous condition to user 204). As referred to herein, the term "media asset" should be understood to refer to an electronically consumable user asset, e.g., television programming, as well as pay-per-view programs, on-demand programs (as in video-on-demand (VOD) systems), Internet content (e.g., streaming content, downloadable content, webcasts, etc.), augmented reality content, virtual reality content, video clips, audio, playlists, websites, articles, electronic books, blogs, social media, applications, games, and/or any other media or multimedia, and/or combination of the above.

Each of user 102 and 204 may have a user profile with the SHMS specifying respective characteristics of the users. Alternatively, one or more of such users may be a guest without a user profile, and characteristics of one or more guests may be determined in real time. In some embodiments, user 204 may be wearing or holding a user device (e.g., a wearable camera, or any other suitable device) which may be associated with user 204 via the user profile of user 204, and/or user 102 may be wearing or holding a user device. The SHMS, upon determining that user 204 is close to or interacting with object 208 (e.g., an oven or stove, or other potentially hazardous device, which may be determined based on a live camera feed proximate to object 208 or using any other suitable technique or any combination thereof) may provide a notification 206 to user 102, e.g., via television 116 or any other suitable user device. In some embodiments, such determination may be based on one or more body parts of user 204 being proximate to object 208. For example, notification 206 may correspond to a camera feed of user 204 in proximity to object 208, and/or an augmented reality scene providing a warning or indication of how a hazardous condition might occur. The SHMS may when providing notification 206, cause media asset 202 to be paused, and/or may enable user 102 to provide a voice command (e.g., "Get away from the stove!") to user 204, e.g., via a microphone of television 116 or other user device, for output via a speaker of a user device associated with user 204 and/or a speaker proximate to object 208. Such voice command may be provided in real time or may be pre-recorded. The SHMS itself may provide notification 206 in response to determining that user 204 is a vulnerable user. For example, notification 206 may not be provided if user 204 is not determined to be a vulnerable user, e.g., if the user proximate to object 208 is a spouse of user 102 who need not be monitored around object 208. In some embodiments, user 204 may not be wearing or carrying a particular device, and instead may be monitored via a baby camera or other camera positioned at one or more locations in environment 200.

In some embodiments, the SHMS may maintain a profile for one or more pets in environment 100 or 200. For example, the SHMS may provide a notification to user 102 that a particular household pet is proximate to an object that constitutes a potentially hazardous situation for the pet. In some embodiments, the pet profile may indicate certain pet characteristics, e.g., how high a cat is able to jump, determined based on monitored actions of the cat or a type of breed of the cat; a radius of a dog's tail wagging, determined based on monitored actions of the dog or a type of breed of the dog, or any other suitable pet characteristics. Such characteristics may be taken into account by the SHMS in determining whether a pet is in a hazardous situation, e.g., in which the pet may be injured, or may damage an object, and an augmented reality scene or other notification may be provided to user 102 regarding the pet.

Figure 3A:
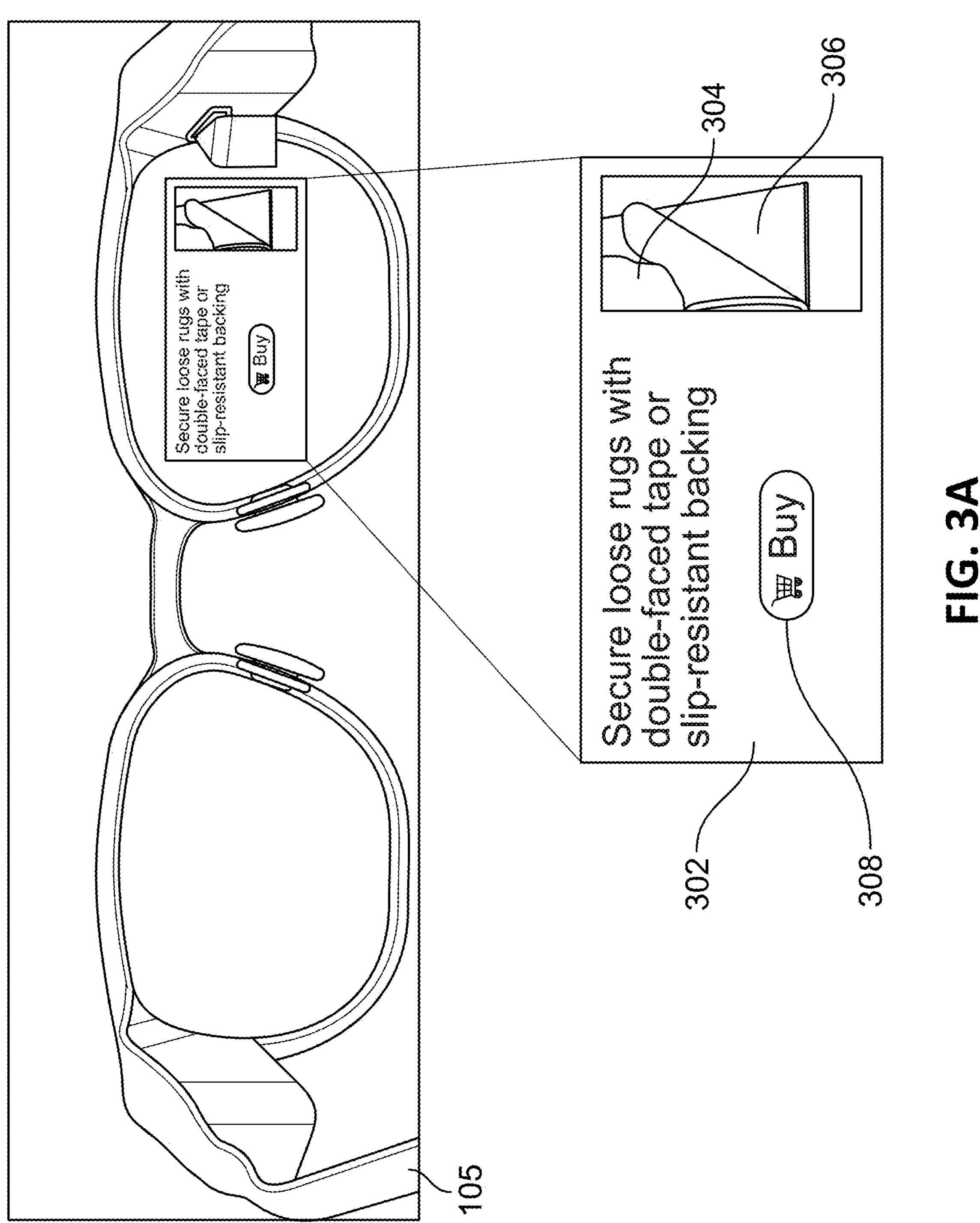
FIGS. 3A-3C show illustrative augmented reality scenes comprising a recommended corrective action, in accordance with some embodiments of this disclosure.
Figure 3B:
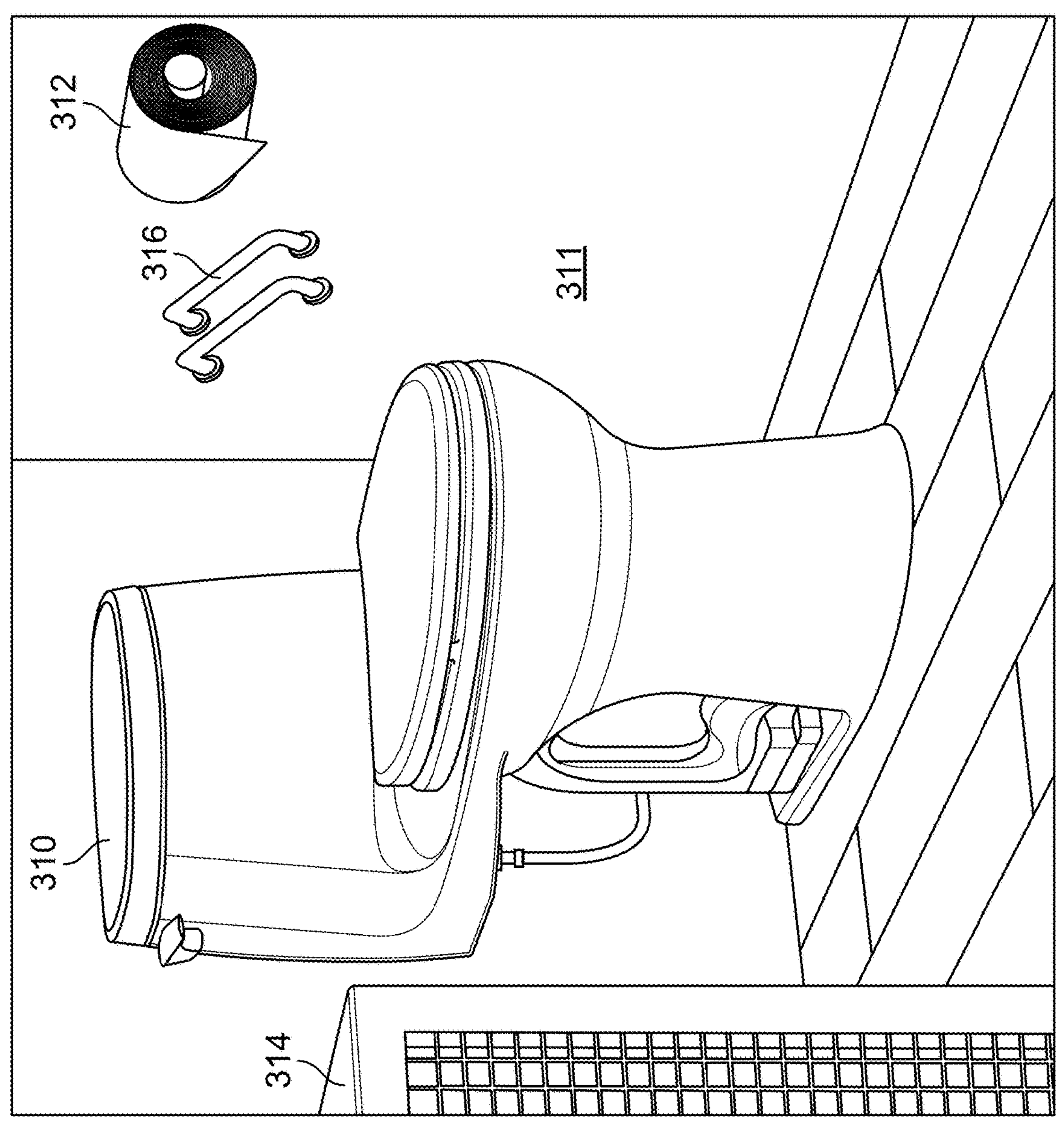
Figure 3C:
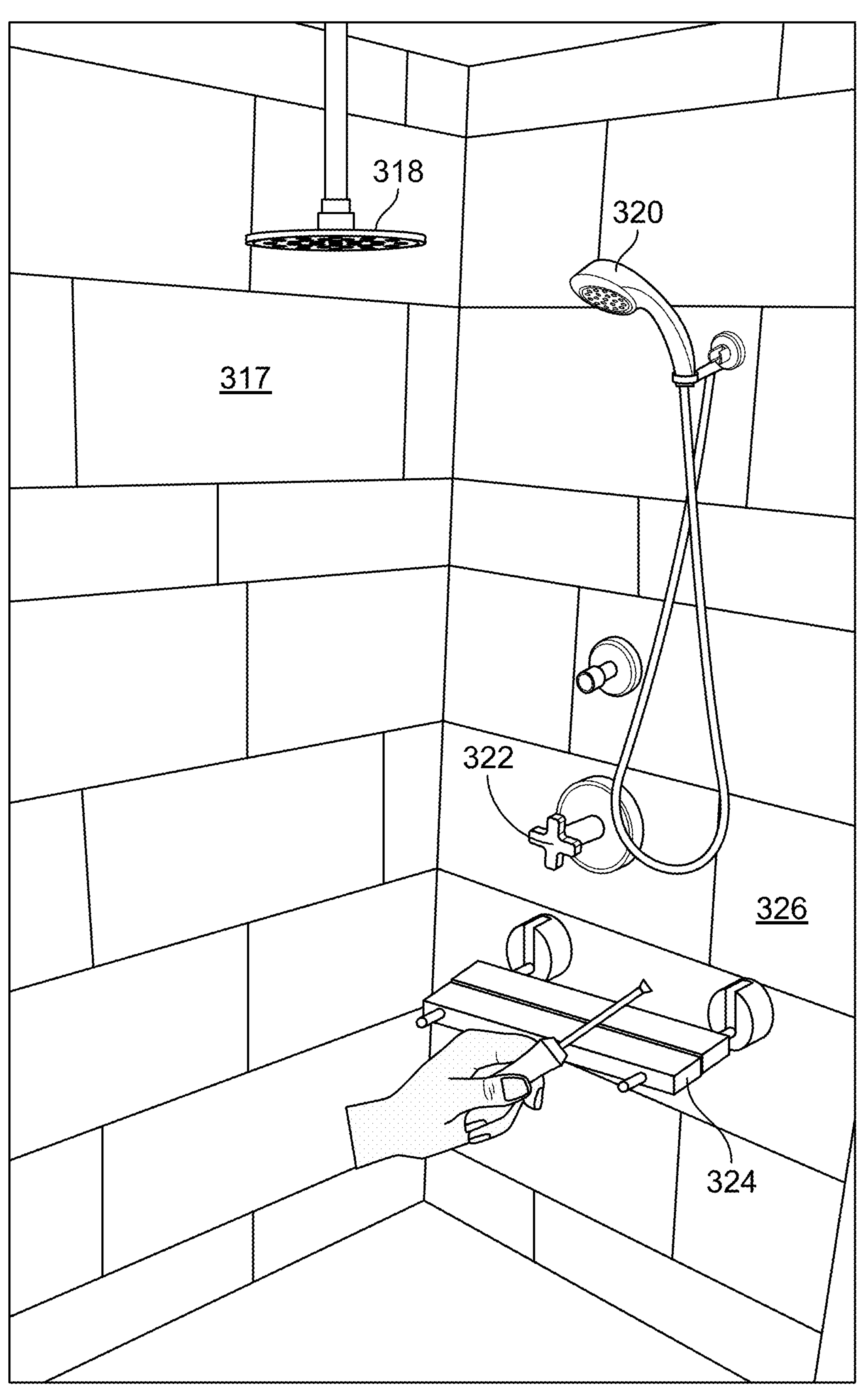

FIGS. 3A-3C show illustrative notifications comprising a recommended corrective action, in accordance with some embodiments of this disclosure. As shown in FIG. 3A, the SHMS may cause user device 105 to generate notification 302 for presentation. Notification 302 may comprise a recommended corrective action, e.g., "Secure loose rugs with double-faced tape or slip-resistant backing," associated with object 304. Object 304 may be a rug present in an environment of a user, and notification 302 may be provided by the SHMS in response to a user performing a walk-through of an environment containing object 304 and/or capturing an image or otherwise determining the presence of object 304 and/or monitoring actions of users in the environment, e.g., determining that a user almost slipped on rug 304. In some embodiments, object 304 depicted in notification 302 may match the appearance of the object within the environment and may be augmented with object 306 (e.g., a slip-resistant backing for object 304) that is not currently present in the environment. In some embodiments, notification 302 may be provided in response to determining that the potentially hazardous condition is not proximate to the user or in a field of view of the user (e.g., object 304 is no longer detected in a camera feed). In some embodiments, notification 302 may comprise a buy option 308, which when selected may enable the user to navigate to a website or application that enables the user to purchase object 306 associated with the corrective action.

As shown in FIG. 3B, the SHMS may determine the locations and classifications of a variety of objects in environment 311 (e.g., a restroom or any other suitable room), such as, for example, toilet 310, toilet paper roll 312, sink countertop 314, or any other suitable objects, or any combination thereof. The SHMS may provide a recommendation to install toilet grab bars at one or more locations in environment 311, e.g., in the form of virtual grab bars 316. In some embodiments, recommendation may be made in response to determining that one or more elderly and/or otherwise compromised users live at a location comprising environment 311 or frequent such location, and thus may benefit from grab bars 316 when using toilet 310, e.g., to allow elderly users or other compromised users to support themselves and avoid injury in environment 311. In some embodiments, the SHMS may provide recommendations during the initial setup when the 3D AR home cloud scanning is made, e.g., performed by a device of a buyer or renter or home inspector, or any other suitable user. Such recommendations may include at least one of purchase, installation, or maintenance service offers associated with the recommendations or advertisements included within the notifications, which may be augmented reality scenes.

As shown in FIG. 3C, the SHMS may determine the locations and classifications of a variety of objects in environment 317 (e.g., a bathroom or restroom or any other suitable room), such as, for example, shower head 318, shower head 320, shower handle 322 or any other suitable objects, or any combination thereof. The SHMS may provide a recommendation 326 to install a shower seat at one or more locations in environment 317. In some embodiments, recommendation 326 may be made in response to determining that one or more elderly users and/or otherwise compromised users live at a location comprising environment 317 or frequent such location, and thus may benefit from shower seat 324 when using the shower in environment 317, e.g., to allow elderly users or other compromised users to support themselves and avoid injury in environment 317. In some embodiments, notification 326 may comprise an augmented reality scene provided via any suitable user device. In some embodiments, notification 326 may be provided based on preferences indicated in a user profile of a user. In some embodiments, augmented reality scene 326 may comprise images and/or video that provides instructions regarding how to install object 326.

FIG. 4 shows an illustrative data structure 400, in accordance with some embodiments of this disclosure. Data structure 400 may comprise a 3D potential hazard library corresponding to a particular environment, e.g., one of the environments of FIGS. 1-3, any other suitable environment, or any combination thereof. The SHMS may store at data structure 400 any suitable number of and types of objects and corresponding locations and images of the respective objects. For example, the SHMS may e.g., based on an initial walkthrough the SHMS requests the user to perform, capture images of various objects in a particular environment, and monitor and update the locations and types of objects in the environment based on sensor data over time. For example, data structure 400 may store an indication that an object of electric cord 402 is located in a second floor bedroom 404, along with one or more images 406, 408 of different views or portions or orientations of electric chord 402. In some embodiments, data structure 400 may store one or more augmented reality scenes or notifications associated with potentially hazardous conditions associated with a particular object, or any other suitable information, or any combination thereof.

Data structure 400 may store an indication that an object of knife 410 is located at kitchen counter 412, along with one or more images 414, 416 of different views or portions or orientations of knife 410; an indication that an object of a bleach bottle 418 is located at first floor laundry room 420, along with one or more images 422, 424 of different views or portions or orientations of bleach bottle 418; and/or an indication that an object of a stove 426 is located at a center of kitchen 428, along with one or more images 430, 432 of different views or portions or orientations of stove 426; or any other suitable objects and corresponding information, or any combination thereof.

FIG. 5 shows an illustrative data structure 500, in accordance with some embodiments of this disclosure. Data structure 500 may store one or more objects in a particular environment having been marked or tagged by a user, to enhance the 3D potential hazard library. For example, the SHMS may enable the user to enhance the pre-populated baseline of objects (e.g., objects 402, 410, 418, 426 in data structure 400, or any other suitable object, or any combination thereof) to mark other objects as being associated with potentially hazardous situations, and/or delete objects specified by data structure 400. For example, the SHMS may permit the user to specify that images 506 and 508 correspond to floor 502 located on a second floor 504 of a particular environment and are associated with a potentially hazardous condition (e.g., a puddle) in the library of the SHMS, based on past experience with water puddles causing hazards in his or her home. In some embodiments, data structure 500 may be added to data structure 400. For example, during an initial walkthrough, the SHMS may prompt the user to confirm that the classification and location of the object identified by the SHMS are an accurate identification of the object, and provide options for the user to modify the classification or location, and/or specify that an image captured by the SHMS depicts a particular object. In some embodiments, if a particular scenario occurred (e.g., a child climbing a chair, a body part being close to an object, or any other scenario, or any combination thereof) but was not flagged by the SHMS as a potentially hazardous condition, the SHMS may permit a user to specify that a particular scenario (e.g., captured on camera) corresponds to a particular potentially hazardous condition for which a warning should be provided.

FIG. 6 shows illustrative data structures 601, 603, 605, in accordance with some embodiments of this disclosure. One or more of data structures 601, 603, 605 may be stored as part of, or otherwise in association with, the data structures of FIG. 4 and/or FIG. 5. As shown in data structure 601, the SHMS may classify individuals and their devices, and may store one or more profiles for users in column 602, e.g., a profile for a male adult, a female adult, a teenager, a toddler, and an elderly male, or any other suitable humans or pets, or any combination thereof, determined to be living in or frequently present at a particular environment. Data structure 601 may comprise, for each respective user profile indicated in column 602, a corresponding indication in column 604 whether the SHMS has determined that the user associated with the user profile is a hazard-vulnerable user. Data structure 601 may comprise column 606 indicating one or more user devices associated with each user profile. For example, the user profile of the male adult may indicate that he is not a vulnerable user, and uses a particular smart glasses, which may be specified by at least one of a unique device identifier and/or model number or any other suitable identifier. The SHMS may track the user's movement through a particular environment based at least in part on an assumption that the user carries or is close to his or her associated user device.

In some embodiments, certain types of devices (e.g., wearable cameras and smart glasses or any other suitable user device or any combination thereof) may be assumed by the SHMS to be worn and/or with the user at all times. In some embodiments, an administrator user may be permitted by the SHMS to set up user profiles and specify settings in association with the user profiles. In some embodiments, a user profile may be associated with a certain type of, or manner of displaying, an augmented reality scene in connection with a potentially hazardous condition. In some embodiments, the vulnerability of the user may be based on long-term characteristics (e.g., age, disability, etc.) and/or short-term characteristics (e.g., distracted, stressed, etc.), considered in combination with a detected object proximate to the user. In other words, in at least some circumstances, a user that generally is not considered vulnerable by the SHMS may be temporarily considered vulnerable.

In some embodiments, the SHMS may determine a type of alert, or whether to provide an alert at all, for a potentially hazardous condition based at least in part on the vulnerability indication for a particular user. For example, the user profile associated with the toddler or elderly male may be provided an alert in a situation in which the male adult or female adult may not be provided an alert, and/or may be provided with a more urgent alert than the male adult or female adult may be provided with in the same situation, and/or non-vulnerable users may be provided with an alert concerning the vulnerable user.

In some embodiments, the SHMS may determine that a user present in a particular environment is a guest of the environment rather than a resident of the environment, and may treat such user differently than users who reside or are more frequently present in the environment. For example, the SHMS may determine a guest is on the local Wi-Fi network via his or her device, but there is no profile associated with the device. If the SHMS detects a potentially hazardous condition, the SHMS may issue a warning to not only the user device of the guest, but also to one or more other devices, e.g., a device of male adult or female adult indicated in data structure 601. In some embodiments, the SHMS may determine whether the guest is a vulnerable user by analyzing one or more characteristics of the guest in real time, and if the guest is vulnerable, may provide alerts in a similar manner as to vulnerable users having user profiles.

In some embodiments, the SHMS may offer the ability for a user to child proof his or her home. For example, the SHMS may request the user to perform a walkthrough through an environment, and suggest moving a location of one or more objects (e.g., with an arrow pointed towards, or any other indicator or any combination thereof of, the suggested new location), purchasing one or more objects, or removing one or more objects from the environment, to help facilitate safety of a child living or other vulnerable person in the environment or expected to be living or expected to be present in the environment. For example, the SHMS may provide augmented reality scenes suggesting the user include covers for outlet plugs in the environment, and/or demonstrating how to install the outlet plugs, and/or providing a link to purchase such plugs. As another example, the SHMS may suggest installing carpets instead of hardwood floors to decrease the likelihood of a child falling and/or to better cushion any falls. In some embodiments, if a user declines to implement the suggested changes, the SHMS may cause one or more devices in the environment to output a warning or disclaimer message regarding the suggested corrective action. In some embodiments, the SHMS may provide an example (e.g., via an augmented reality scene) of a potential accident that may occur if the suggested change is not implemented.

In some embodiments, the SHMS may determine that certain hazards are common in particular ages or age groups, and/or for certain users, and provide warnings accordingly. For example, the SHMS may reference historical information for the toddler indicated in column 602 and/or other toddlers in other environments, to determine common hazards for certain ages or age groups, and tailor warnings provided to such toddler (and/or male adult and female adult indicated in column 604, which may correspond to parents of the toddler) in the particular environment based on the referenced information. For example, the SHMS may determine that there is a higher likelihood for the toddler to encounter a potentially hazardous situation that is similar to potentially hazardous situations encountered by similarly aged users.

In some embodiments, voice commands of the male adult and female adult indicated in column 604, e.g., parents of the toddler indicated in column 602, may be transmitted in real time, or recorded, in order to provide such voice commands to children (or elderly individuals or disabled individuals) proximate to one or more objects determined to be associated with a potentially hazardous scenario. For example, the voice command may be output via a speaker and/or via a display of a user device associated with the child, and/or any other device proximate to the child, and may be personalized to the particular child. A video feed may be provided to the parents to indicate how well the child followed the instructions, e.g., "Back away from the stove, Danny!" In some embodiments, such a custom voice recording may be utilized in the event that a particular human (e.g., the toddler indicated in column 602) repeatedly encounters the same potentially hazardous scenario.

In some embodiments, a training manual for a particular device may be provided to the SHMS via an API. For example, a user profile may be associated with a native language spoken and understandable to the user, and interactive or visual instructions may be provided to the user in his or her native language, or any other suitable language specified by the user, via the SHMS, indicating how to use a device associated with the training manual. In some embodiments, the training manual may visually and/or via audio indicate to the user proper and/or improper ways of using the device and/or common hazardous conditions associated with using the device.

As shown in data structure 603, the SHMS may cause indications of different sensitives to be stored with respect to hazardous objects. In some embodiments, such sensitives may be associated with notifications and filtering false positives, which may be parameters adjustable by the user. Column 608 may specify different relationships of a potentially hazardous object with respect to a user, e.g., whether a user is in close proximity to the potentially hazardous object, whether a potentially hazardous object is within a field of view of the user, whether the object is in a hazardous situation. Column 610 may indicate whether a vulnerable user is provided with a warning in the respective situations specified in column 608; column 612 may indicate whether a non-vulnerable user is provided with a warning in the respective situations specified in column 608, and column 614 may indicate whether a warning should be provided to a non-vulnerable user with respect to the vulnerable user in the scenarios specified in column 608. For example, the SHMS may determine a type of alert, or whether to provide an alert at all, for a potentially hazardous condition based at least in part on the vulnerability indication for a particular user. For example, the user profile associated with the toddler or elderly male specified in column 604 of data structure 601 as a vulnerable user may be provided an alert in a situation that the male adult or female adult may not be provided an alert, and/or may be provided with a more urgent alert than the male adult or female adult may be provided with in the same situation, and/or non-vulnerable users may be provided with an alert concerning the vulnerable user, whereas a vulnerable user may not be provided an alert regarding a non-vulnerable user.

In some embodiments, just the mere fact that a potentially hazardous object is determined by the SHMS to be close to a user may be enough to generate an alert to other users. For instance, an adult may be issued a warning (e.g., including an augmented reality scene or any other suitable warning) by the SHMS that the toddler is nearby or within the field of view of a bleach bottle (e.g., within one foot, or within any suitable distance), since the toddler may try to open the bottle and waiting until the bottle is open may not provide a sufficient notice period to enable the adult to prevent an accident or correct the situation. As another example, if the SHMS determines an elderly individual is nearby or within the field of view of a knife, an alert (e.g., including an augmented reality scene or any other suitable warning) may be generated and provided to a device of the elderly individual and one or more other users within the household. In some embodiments, if the non-vulnerable user receiving the alert is not sure about the severity of the situation, such user may request the SHMS to send a video feed from the vulnerable user to review the live feed and make an assessment as to what action to take.

As shown in data structure 605, the SHMS may cause indications of potential accidents (column 616) to be stored in association with one or more hazardous objects, indicated in columns 618 and 620. For example, the SHMS object hazard library may sort the AR hazard warning system trigger based on types of accidents and create classes to associate images of objects in a particular environment (e.g., shown in data structure 400). For example, data structure 605 may indicate that a knife or broken glass being proximate (e.g., within a certain threshold, or within a field of view, or any other suitable metric, or any combination thereof) to a user is a cutting hazard, and the SHMS may provide a warning by referencing this database entry. In some embodiments, the SHMS may determine, based on the 3D library contents, that the presence of at least two objects in proximity to each other acts as a trigger to activate a warning (e.g., an AR household hazard warning system) such as, for example, bleach or a wine bottle and a stove fire constituting a fire hazard, or an unsecured mirror on top of a drawer constituting a falling object hazard, even if they are not hazardous by themselves, and even if a user is not proximate to the objects. In some embodiments, a camera of a user device may be configured to turn on when the SHMS detects that at least two objects (e.g., stored in a corresponding row of columns 618 and 620) are determined to be in a vicinity of each other.

In some embodiments, the SHMS object hazard library shown at data structure 605 may comprise, or be enhanced via pulling data from, IFTTT types of semantic systems. For example, an IFTTT trigger may comprise a Household Hazard AR Warning service being triggered based on the SHMS determining that a hazardous image is present in a camera feed. As another example, an IFTTT action may comprise an SHMS service being triggered such that the SHMS provides an overlay of a warning on a user device.

Figure 7:
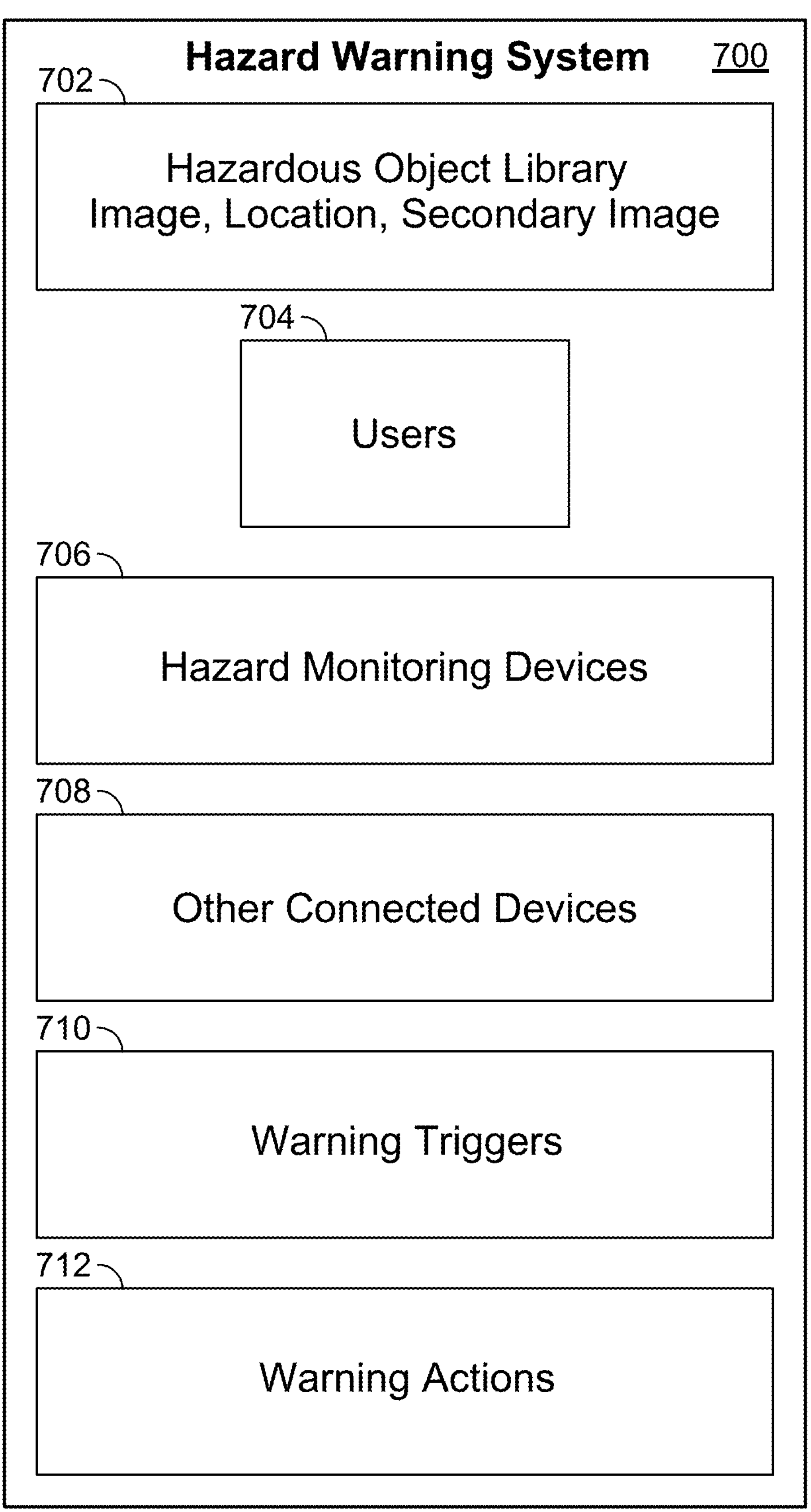
FIG. 7 shows an illustrative system 700, in accordance with some embodiments of this disclosure.

FIG. 7 shows an illustrative system 700, in accordance with some embodiments of this disclosure. Hazard warning system 700 may be configured to implement the SHMS and may comprise hazardous object library 702 (e.g., specified in data structure 400 or any other suitable data structure or any combination thereof), which may comprise one or more of an image of an object identified in the environment, a location of the object and a secondary image of the object, and any other suitable information or any combination thereof. Hazard warning system 700 may comprise indications of users 704 in the environment, hazard monitoring devices 706, other connected devices 708, warning triggers 710 and warning actions (e.g., specified in the data structure of FIG. 6 or any other suitable data structure or any combination thereof). In some embodiments, hazard warning system 700 may comprise a household or other environment augmented reality system.

In some embodiments, the SHMS may be connected to any suitable number or types of other knowledge cloud systems, to enable the object library to be enhanced with any suitable number or types of images of potential hazard-related object images and/or corresponding hazard image status/orientation images. For example, the SHMS may be connected to many other knowledge cloud systems such that the object library may have access to thousands if not millions of potential hazard-related object images corresponding to the potential hazard object that the SHMS may use to enhance the library with from a variety of sources. Such enhancement may use data from previous incidents within this household (or one or more other households or other environments) as well as using machine learning algorithms identifying hazardous conditions by way of computer vision analysis, or any other suitable technique or any combination thereof, of corresponding crowd-sourced images. In some embodiments, the SHMS may be a local system connected to the cloud, e.g., learning locally, which may then be used in other environments.

Figure 8:
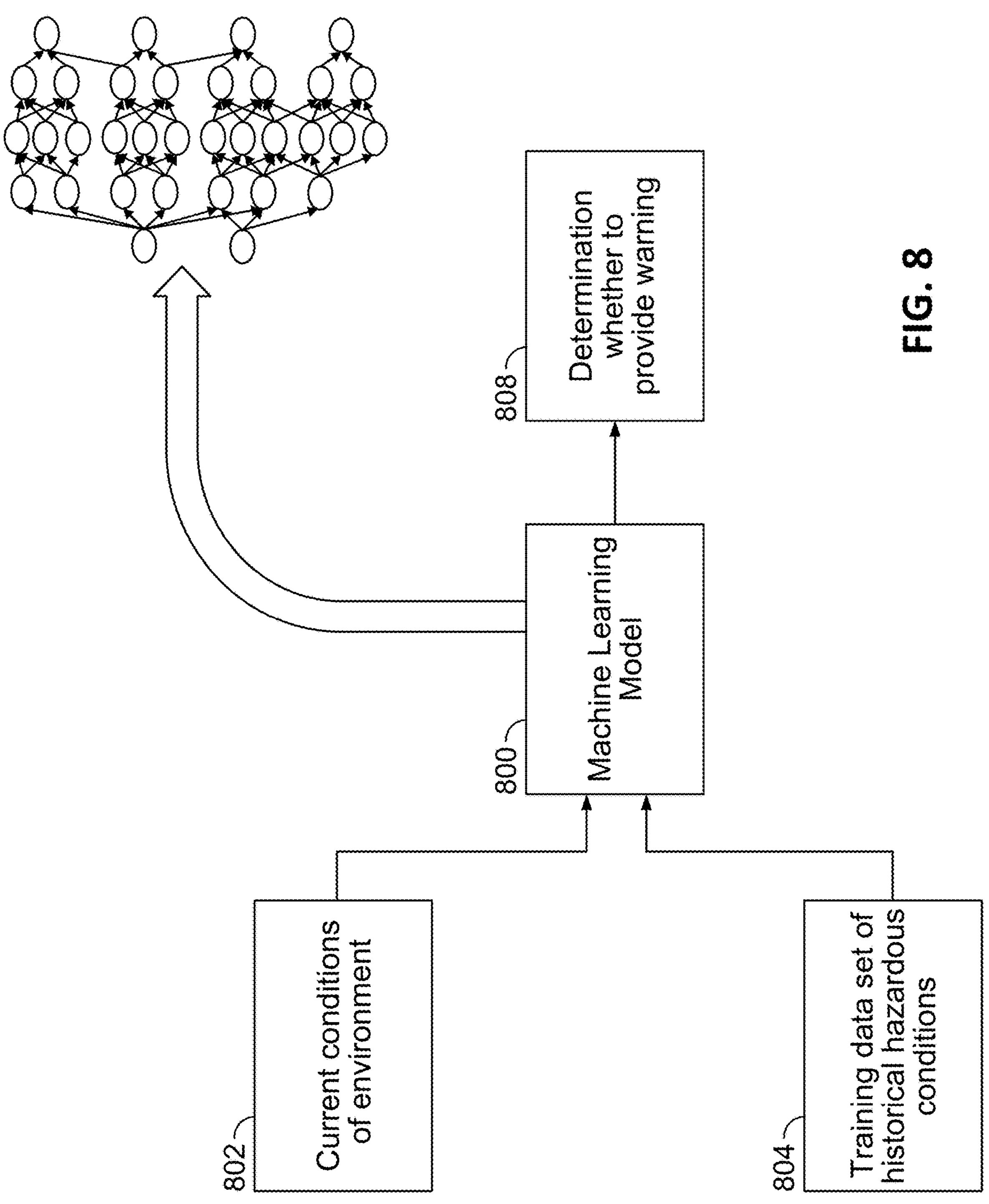
FIG. 8 shows an illustrative example of a machine learning model 800 used to determine whether to provide a warning, in accordance with some embodiments of this disclosure.

FIG. 8 shows an illustrative example of a machine learning model 800 used to determine whether to provide a warning, in accordance with some embodiments of this disclosure. Machine learning model 800 may correspond to, for example, a neural network, a native Bayes model, logistic regression model, or any other suitable model, or any combination thereof, and may be used to determine whether to provide a warning to one or more users in a particular environment. Machine learning model 800 may be used to perform such determination based on current conditions of the environment (e.g., stored at data structures of FIGS. 4-6, or any other suitable data structure, which may comprise user profile data, vulnerability of users, locations and conditions of objects, or any other suitable data, or any combination thereof) determined by the SHMS. In some embodiments, the collected data may be processed (e.g., by applying processes such as denoising, down sampling, artifact/outlier removal, etc.) and extraction of features may be performed (e.g., using inferential statistics, frequency domain analysis or any other suitable technique or any combination thereof) for input (e.g., as feature vectors or any other suitable numerical representation or any combination thereof) to machine learning model 800. In some embodiments, machine learning model 800 may be stored and executed at one or more of user devices, networking equipment, IoT objects, and/or a remote server.

In some embodiments, machine learning model 800 may be trained using training data set 804 comprising indications of historical hazardous conditions and actions taken with respect to users having certain characteristics. For example, training data set 804 may comprise one or more of the examples as described in connection with FIGS. 1-7, which may be used as a data point for machine learning model 800, or any other suitable examples, or any combination thereof. For example, training data may be labeled as rising to the level of providing a warning or not rising to the level of providing a warning, and/or the training data may indicate a manner of providing the warning and/or to how many devices the warning is provided. In some embodiments, the training examples may be labeled based on feedback received from users as to whether a warning provided in a particular scenario was adequate or not.

Trained machine learning model 800 may accept as input current conditions of the environment 802 and output 808 a determination of whether to provide a warning and/or suggested manner of providing a warning and/or to which devices the warning should be provided. In some embodiments, trained machine learning model 800 may learn user-specific behavior patterns and certain attributes of users. For example, machine learning model 800 may learn the profile of each user (e.g., body width, height, age, etc.) and/or differentiate users from other objects (human vs. dog, based on height and width comparisons). In some embodiments, the user profile may be stored without any personally identifiable information.

Figure 9:
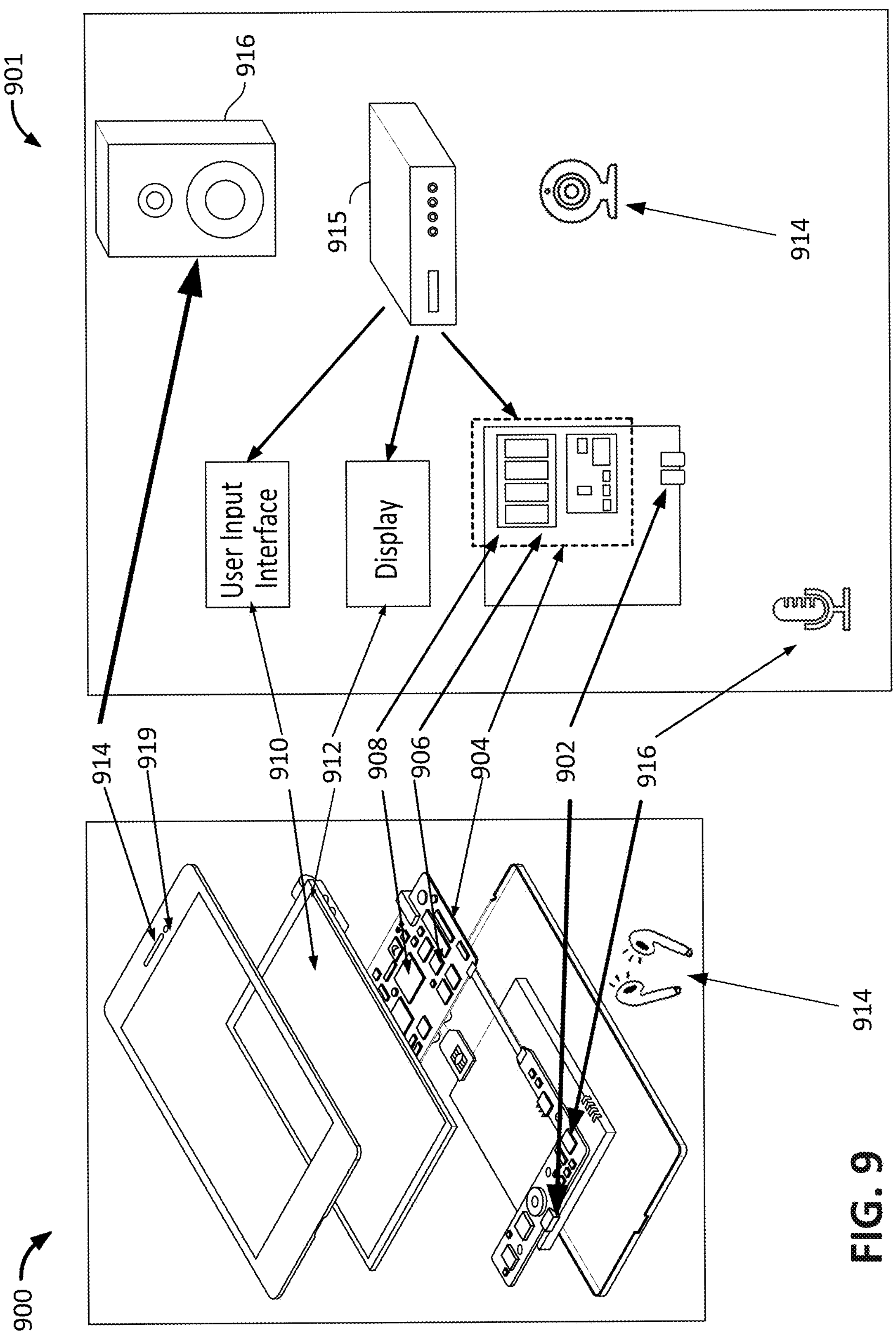
FIG. 9 shows illustrative user equipment devices, in accordance with some embodiments of this disclosure.
Figure 10:
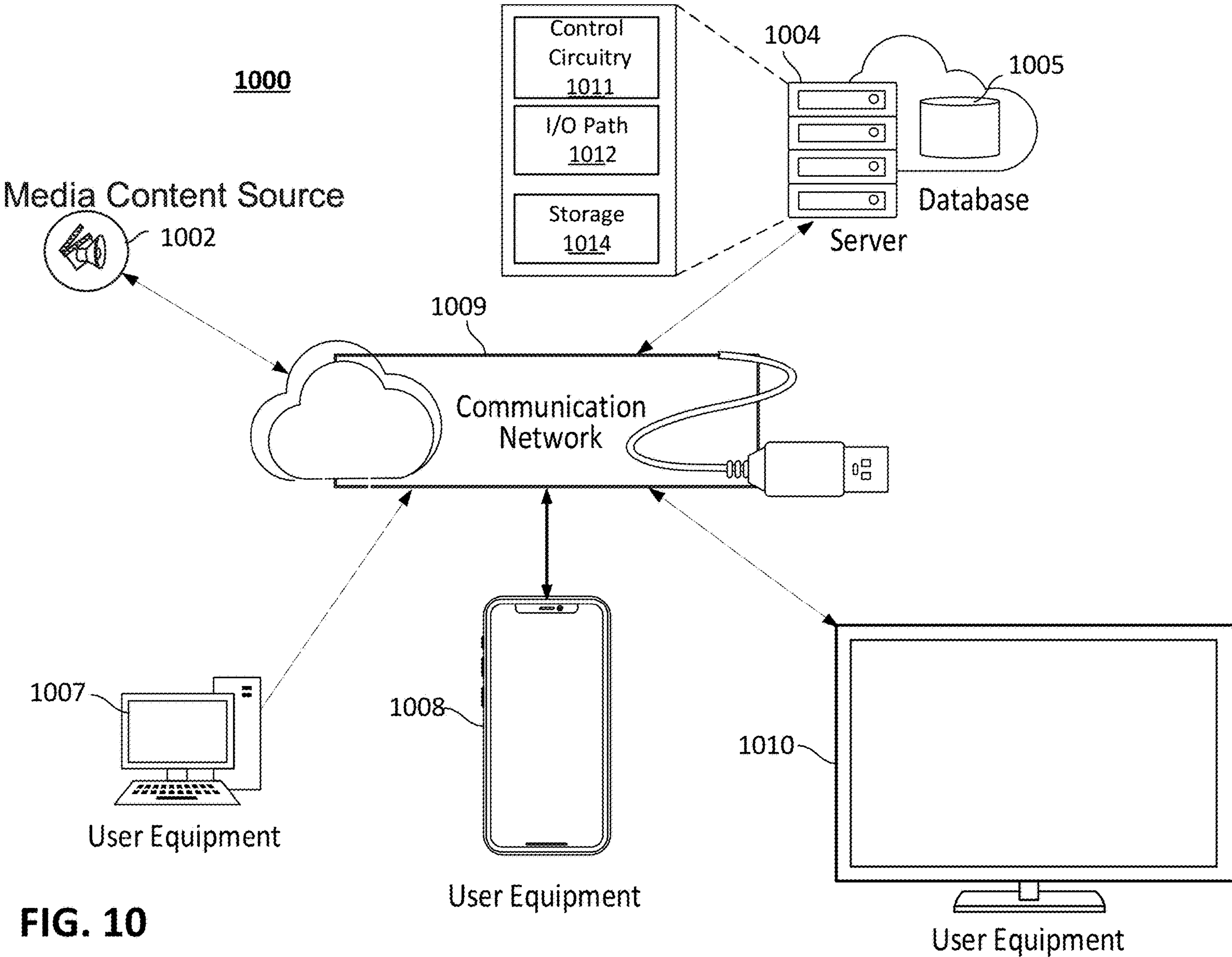
FIG. 10 shows illustrative systems, in accordance with some embodiments of this disclosure.

FIGS. 9-10 describe illustrative devices, systems, servers, and related hardware for providing a warning regarding a potentially hazardous condition in an environment, in accordance with some embodiments of this disclosure. FIG. 9 shows generalized embodiments of illustrative user devices 900 and 901, which may correspond to, e.g., user device 104, 105, 106 and/or 116 of FIG. 1 or FIG. 2; devices specified in column 606, hazard monitoring devices 706 and/or other connected devices of FIG. 7, or any other suitable devices, or any combination thereof. For example, user equipment device 900 may be a smartphone device, a tablet, smart glasses, a virtual reality or augmented reality device, or any other suitable device capable of consuming media assets and capable of transmitting and receiving data over a communication network. In another example, user equipment device 901 may be a user television equipment system or device. User television equipment device 901 may include set-top box 915. Set-top box 915 may be communicatively connected to microphone 916, audio output equipment (e.g., speaker or headphones 914), and display 912. In some embodiments, microphone 916 may receive audio corresponding to a voice of a user, e.g., a voice command. In some embodiments, display 912 may be a television display or a computer display. In some embodiments, set-top box 915 may be communicatively connected to user input interface 910. In some embodiments, user input interface 910 may be a remote control device. Set-top box 915 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment devices are discussed below in connection with FIG. 9. In some embodiments, device 900 may comprise any suitable number of sensors, as well as a GPS module (e.g., in communication with one or more servers and/or cell towers and/or satellites) to ascertain a location of device 900.

Each one of user equipment device 900 and user equipment device 901 may receive content and data via input/ output (I/O) path 902. I/O path 902 may provide content (e.g., broadcast programming, on-demand programming, Internet content, content available over a local area network (LAN) or wide area network (WAN), and/or other content) and data to control circuitry 904, which may comprise processing circuitry 906 and storage 908. Control circuitry 904 may be used to send and receive commands, requests, and other suitable data using I/O path 902, which may comprise I/O circuitry. I/O path 902 may connect control circuitry 904 (and specifically processing circuitry 906) to one or more communications paths (described below). I/O functions may be provided by one or more of these communications paths, but are shown as a single path in FIG. 9 to avoid overcomplicating the drawing. While set-top box 915 is shown in FIG. 9 for illustration, any suitable computing device having processing circuitry, control circuitry, and storage may be used in accordance with the present disclosure. For example, set-top box 915 may be replaced by, or complemented by, a personal computer (e.g., a notebook, a laptop, a desktop), a smartphone (e.g., device 900), a tablet, a network-based server hosting a user-accessible client device, a non-user-owned device, any other suitable device, or any combination thereof.

Control circuitry 904 may be based on any suitable control circuitry such as processing circuitry 906. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 904 executes instructions for the SHMS stored in memory (e.g., storage 908). Specifically, control circuitry 904 may be instructed by the SHMS to perform the functions discussed above and below. In some implementations, processing or actions performed by control circuitry 904 may be based on instructions received from the SHMS.

In client/server-based embodiments, control circuitry 904 may include communications circuitry suitable for communicating with a server or other networks or servers. The SHMS may be a stand-alone application implemented on a device or a server. The SHMS may be implemented as software or a set of executable instructions. The instructions for performing any of the embodiments discussed herein of the SHMS may be encoded on non-transitory computer-readable media (e.g., a hard drive, random-access memory on a DRAM integrated circuit, read-only memory on a BLU-RAY disk, etc.). For example, in FIG. 9, the instructions may be stored in storage 908, and executed by control circuitry 904 of a device 900.

In some embodiments, the SHMS may be a client/server application where only the client application resides on device 900, and a server application resides on an external server (e.g., server 1004 and/or server 1016). For example, the SHMS may be implemented partially as a client application on control circuitry 904 of device 900 and partially on server 1004 as a server application running on control circuitry 1011. Server 1004 may be a part of a local area network with one or more of devices 900 or may be part of a cloud computing environment accessed via the internet. In a cloud computing environment, various types of computing services for performing searches on the internet or informational databases, providing storage (e.g., for a database) or parsing data are provided by a collection of network-accessible computing and storage resources (e.g., server 1004), referred to as "the cloud." Device 900 may be a cloud client that relies on the cloud computing capabilities from server 1004 to determine whether processing should be offloaded and facilitate such offloading. When executed by control circuitry 904 or 1011, the SHMS may instruct control circuitry 904 or 1011 circuitry to perform processing tasks for the client device and facilitate a media consumption session integrated with social network services. The client application may instruct control circuitry 904 to determine whether processing should be offloaded.

Control circuitry 904 may include communications circuitry suitable for communicating with a server, social network service, a table or database server, or other networks or servers The instructions for carrying out the above mentioned functionality may be stored on a server (which is described in more detail in connection with FIG. 9). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as SHMS data described above. Nonvolatile memory may also be used (e.g., to launch a boot-up routine and other instructions). Cloud-based storage may be used to supplement storage 908 or instead of storage 908.

Control circuitry 904 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 904 may also include scaler circuitry for upconverting and downconverting content into the preferred output format of user equipment 900. Control circuitry 904 may also include digital-to-analog converter circuitry and analog-to-digital converter circuitry for converting between digital and analog signals. The tuning and encoding circuitry may be used by user equipment device 900, 901 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment device 900, the tuning and encoding circuitry (including multiple tuners) may be associated with storage 908.

Control circuitry 904 may receive instruction from a user by way of user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of each one of user equipment device 900 and user equipment device 901. For example, display 912 may be a touchscreen or touch-sensitive display. In such circumstances, user input interface 910 may be integrated with or combined with display 912. In some embodiments, user input interface 910 includes a remote-control device having one or more microphones, buttons, keypads, any other components configured to receive user input or combinations thereof. For example, user input interface 910 may include a handheld remote-control device having an alphanumeric keypad and option buttons. In a further example, user input interface 910 may include a handheld remote-control device having a microphone and control circuitry configured to receive and identify voice commands and transmit information to set-top box 915.

Audio output equipment 914 may be integrated with or combined with display 912. Display 912 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 912. Audio output equipment 914 may be provided as integrated with other elements of each one of device 900 and equipment 901 or may be stand-alone units. An audio component of videos and other content displayed on display 912 may be played through speakers (or headphones) of audio output equipment 914. In some embodiments, audio may be distributed to a receiver (not shown), which processes and outputs the audio via speakers of audio output equipment 914. In some embodiments, for example, control circuitry 904 is configured to provide audio cues to a user, or other audio feedback to a user, using speakers of audio output equipment 914. There may be a separate microphone 916 or audio output equipment 914 may include a microphone configured to receive audio input such as voice commands or speech. For example, a user may speak letters or words that are received by the microphone and converted to text by control circuitry 904. In a further example, a user may voice commands that are received by a microphone and recognized by control circuitry 904. Camera 918 may be any suitable video camera integrated with the equipment or externally connected. Camera 918 may be a digital camera comprising a charge-coupled device (CCD) and/or a complementary metal-oxide semiconductor (CMOS) image sensor. Camera 918 may be an analog camera that converts to digital images via a video card.

The SHMS may be implemented using any suitable architecture. For example, it may be a stand-alone application wholly-implemented on each one of user equipment device 900 and user equipment device 901. In such an approach, instructions of the application may be stored locally (e.g., in storage 908), and data for use by the application is downloaded on a periodic basis (e.g., from an out-of-band feed, from an Internet resource, or using another suitable approach). Control circuitry 904 may retrieve instructions of the application from storage 908 and process the instructions to provide media consumption and social network interaction functionality and generate any of the displays discussed herein. Based on the processed instructions, control circuitry 904 may determine what action to perform when input is received from user input interface 910. For example, movement of a cursor on a display up/down may be indicated by the processed instructions when user input interface 910 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 904 may allow a user to provide user profile information or may automatically compile user profile information. For example, control circuitry 904 may access and monitor network data, video data, audio data, processing data, participation data from a SHMS and social network profile. Control circuitry 904 may obtain all or part of other user profiles that are related to a particular user (e.g., via social media networks), and/or obtain information about the user from other sources that control circuitry 904 may access. As a result, a user can be provided with a unified experience across the user's different devices.

In some embodiments, the SHMS is a client/server-based application. Data for use by a thick or thin client implemented on each one of user equipment device 900 and user equipment device 901 may be retrieved on-demand by issuing requests to a server remote to each one of user equipment device 900 and user equipment device 901. For example, the remote server may store the instructions for the application in a storage device. The remote server may process the stored instructions using circuitry (e.g., control circuitry 904) and generate the displays discussed above and below. The client device may receive the displays generated by the remote server and may display the content of the displays locally on device 900. This way, the processing of the instructions is performed remotely by the server while the resulting displays (e.g., that may include text, a keyboard, or other visuals) are provided locally on device 900. Device 900 may receive inputs from the user via input interface 910 and transmit those inputs to the remote server for processing and generating the corresponding displays. For example, device 900 may transmit a communication to the remote server indicating that an up/down button was selected via input interface 910. The remote server may process instructions in accordance with that input and generate a display of the application corresponding to the input (e.g., a display that moves a cursor up/down). The generated display may then be transmitted to device 900 for presentation to the user.

In some embodiments, the SHMS may be downloaded and interpreted or otherwise run by an interpreter or virtual machine (run by control circuitry 904). In some embodiments, the SHMS may be encoded in the ETV Binary Interchange Format (EBIF), received by control circuitry 904 as part of a suitable feed, and interpreted by a user agent running on control circuitry 904. For example, the SHMS may be an EBIF application. In some embodiments, the SHMS may be defined by a series of JAVA-based files that are received and run by a local virtual machine or other suitable middleware executed by control circuitry 904. In some of such embodiments (e.g., those employing MPEG-2 or other digital media encoding schemes), the SHMS may be, for example, encoded and transmitted in an MPEG-2 object carousel with the MPEG audio and video packets of a program.

FIG. 10 is a diagram of an illustrative system 1000, in accordance with some embodiments of this disclosure. User equipment devices 1007, 1008, 1010 (e.g., e.g., user device 104, 105, 106 and/or 116 of FIG. 1 or FIG. 2; devices specified in column 606, hazard monitoring devices 706 and/or other connected devices of FIG. 7, or any other suitable devices, or any combination thereof) may be coupled to communication network 1006. Communication network 1006 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 1006) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 10 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 1006.

System 1000 may comprise media content source 1002, one or more servers 1004, and one or more social network services. In some embodiments, the SHMS may be executed at one or more of control circuitry 1011 of server 1004 (and/or control circuitry of user equipment devices 1007, 1008, 1010. In some embodiments, data structure 400 of FIG. 4, data structure 500 of FIG. 5, data structure 601, 603, 605 of FIG. 6, or any other suitable data structure or any combination thereof, may be stored at database 1005 maintained at or otherwise associated with server 1004, and/or at storage of one or more of user equipment devices 1007, 1008, 1010.

In some embodiments, server 1004 may include control circuitry 1011 and storage 1014 (e.g., RAM, ROM, Hard Disk, Removable Disk, etc.). Storage 1014 may store one or more databases. Server 1004 may also include an input/output path 1012. I/O path 1012 may provide media consumption data, social networking data, device information, or other data, over a local area network (LAN) or wide area network (WAN), and/or other content and data to control circuitry 1011, which may include processing circuitry, and storage 1014. Control circuitry 1011 may be used to send and receive commands, requests, and other suitable data using I/O path 1012, which may comprise I/O circuitry. I/O path 1012 may connect control circuitry 1011 (and specifically control circuitry) to one or more communications paths. I/O path 1012 may comprise I/O circuitry.

Control circuitry 1011 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1011 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1011 executes instructions for an emulation system application stored in memory (e.g., the storage 1014). Memory may be an electronic storage device provided as storage 1014 that is part of control circuitry 1011.

Figure 11:
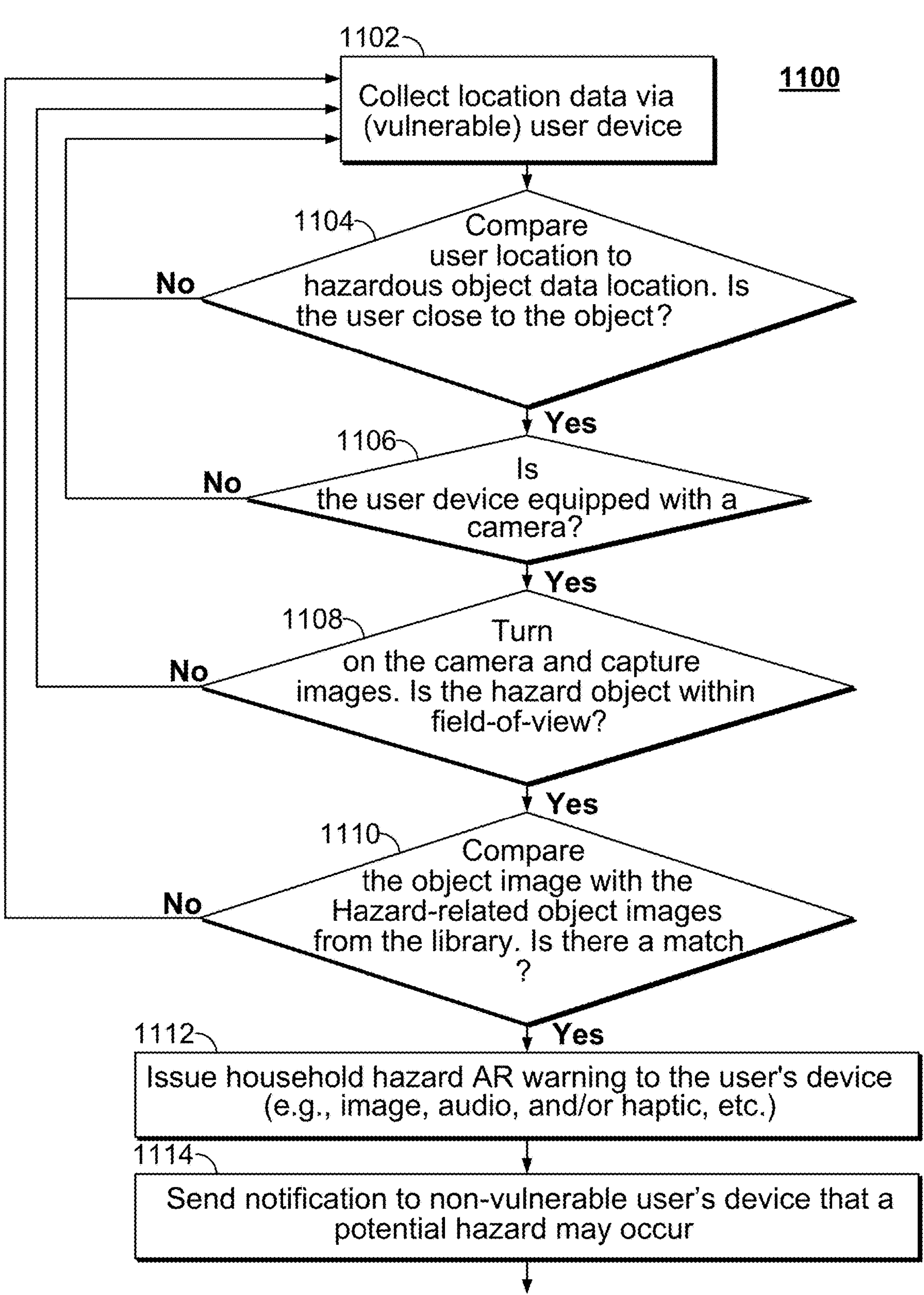
FIG. 11 is a flowchart of a detailed illustrative process for providing to a user an augmented reality scene associated with a potentially hazardous condition and associated with an object, in accordance with some embodiments of this disclosure.

FIG. 11 is a flowchart of a detailed illustrative process for providing to a user an augmented reality scene associated with a potentially hazardous condition and associated with an object, in accordance with some embodiments of this disclosure. In various embodiments, the individual steps of process 1100 may be implemented by one or more components of the devices and systems of FIGS. 1-10. Although the present disclosure may describe certain steps of process 1000 (and of other processes described herein) as being implemented by certain components of the devices and systems of FIGS. 1-10, this is for purposes of illustration only, and it should be understood that other components of the devices and systems of FIGS. 1-10 may implement those steps instead.

At 1102, the SHMS may collect location data associated with a user device (e.g., a wearable camera or any other suitable device) of a vulnerable human (e.g., child 204 of FIG. 2) in a particular environment (e.g., environment 200 of FIG. 2). In some embodiments, the SHMS may continuously track and store locations of the users within the particular environment, and generate a map (e.g., an AR home cloud 3D Map) indicating locations of objects and users within the environment. In some embodiments, wireless signal characteristics (e.g., Wi-Fi signals, Bluetooth signals, or any other suitable signals or any combination thereof) may be used to build the map, and/or sensor data (e.g., images captured by cameras of user devices or security cameras, audio signals captured by microphones, or any other suitable sensor data, or any combination thereof). In some embodiments, the SHMS may be executed at least in part on a user device (e.g., smart glasses, smartphone, wearable camera, etc.) and may be configured to compare its location with respect to the AR home cloud 3D Map at all times and validate its current location using any suitable visual positioning system (VPS) methods, e.g., using other previously scanned objects as anchors, or using any other suitable technique, or any combination thereof.

In some embodiments, data collection by the SHMS, which may comprise a household hazard AR warning system, may be always on for vulnerable users determined to be likely to be injured by or more susceptible to household accidents. In some embodiments, a status of a user originally deemed non-vulnerable may be changed by the SHMS based on further data discovery, e.g., if the user is moving at an accelerated speed (such as running, walking up/down steps), which may be detected by an accelerometer or gyrometer or other sensor by way of a user device or the SHMS detects an elevated heart rate (e.g., detected by smart watch or other user device), which may indicate that the user is busy and thus the user's cognitive state may not be sufficiently alert to pay attention to hazards and unsecured conditions. In some embodiments, such changed status may trigger the hazard AR warning system to turn active for the user associated with the changed status.

At 1104, the SHMS may compare the location of the user device determined at 1102 to location data of a hazardous object. For example, the SHMS may determine whether a user device (e.g., a wearable camera or any other suitable device) of user 204 is proximate to object 208 (e.g., within a predefined threshold, such as one foot, or any other suitable distance) or whether object 208 of FIG. 2 is within a field of view of a user device of user 204. If the user is sufficiently close to the potentially hazardous object, processing may proceed to 1106; otherwise processing may return to 1102.

At 1106, the SHMS may determine whether a user device of the vulnerable user (e.g., user 204 of FIG. 2) is equipped with a camera. If yes, processing may proceed to 1106; otherwise processing may return to 1102. In some embodiments, a security camera or other sensor may be used to determine that the hazardous object is near the vulnerable user, and in that case processing may proceed to 1110.

At 1108, the SHMS may turn on a camera of a user device (e.g., a wearable camera) of the vulnerable user. In some embodiments, once the SHMS is active on a user's device, it may continuously collect location data, and once the SHMS determines that the user is close to a hazardous object, a camera of the user device may be turned on. The SHMS may determine whether the hazardous object is in a field of view of the vulnerable user. If yes, processing may proceed to 1110; otherwise processing may return to 1102.

At 1110, the SHMS may compare an image of the potentially hazardous object (e.g., captured by a user device of user 204 of FIG. 2) with related images of the object from the object library (e.g., stored in the data structure of FIG. 4). For example, object 208, which is a stove, may be compared to images of the stove previously captured and stored by the SHMS or generic images of a stove, to determine whether there is a match. Any suitable image processing algorithms and/or machine learning techniques may be used in classifying the object depicted in the image. In some embodiments, the potentially hazardous object and the hazardous image situation may be captured simultaneously, e.g., by the (wearable) camera/smart glasses, and the SHMS may perform a search and comparison of the image(s) to the trigger kept on the SHMS. If the SHMS determines at 1110 there is a match, processing may proceed to 1112; otherwise processing may return to 1102.

At 1112, the SHMS may issue a household hazard AR warning to the user device (e.g., a user device of the vulnerable user) in any suitable form, e.g., image, audio, haptic, or any combination thereof. The warning may comprise an augmented reality scene that demonstrates what an accident may look like if it occurred, and/or instructions to avoid interacting with the potentially hazardous object. In some embodiments, if the SHMS, e.g., via computer vision, detects a vulnerable user close to, and a human body part (e.g., hand, arm, leg, etc.) next to, the hazardous object within the field-of-view of the user, the SHMS may immediately jump to a hazard AR warning level of a high urgency.

At 1114, the SHMS may send a notification to one or more devices of one or more non-vulnerable users (e.g., parents of user 204) that a potential hazard may happen with respect to the vulnerable user. In some embodiments, such devices of the non-vulnerable users may be provided with an augmented reality scene similar to the augmented reality scene provided at 1112. In some embodiments, the non-vulnerable parents may be permitted to transmit a voice command in real time to the vulnerable user, or a recorded voice command regarding the hazardous object may be provided to the vulnerable user, which may be personalized to the user, e.g., "Keep away from the stove, Danny."

In some embodiments, the Household Hazard AR Warning system provided by the SHMS may be customized to the particular user depending on the user's device capabilities. For example, user devices such as smart glasses, smartphone, wearable camera, or any other suitable user device or combination thereof, may be used to collect visual data through their image sensors, and devices such as smart glasses, smartphone, wearable camera or any other suitable user device or combination thereof may be used to provide augmented reality effects based on audio (e.g., via speakers), video, and/or haptic capabilities. In some embodiments, the SHMS may enable a user to turn off a camera feed of his or her user device and/or remove warnings when a hazard alert mode ends to get back to a monitor mode, e.g., at 1102.

Figure 12:
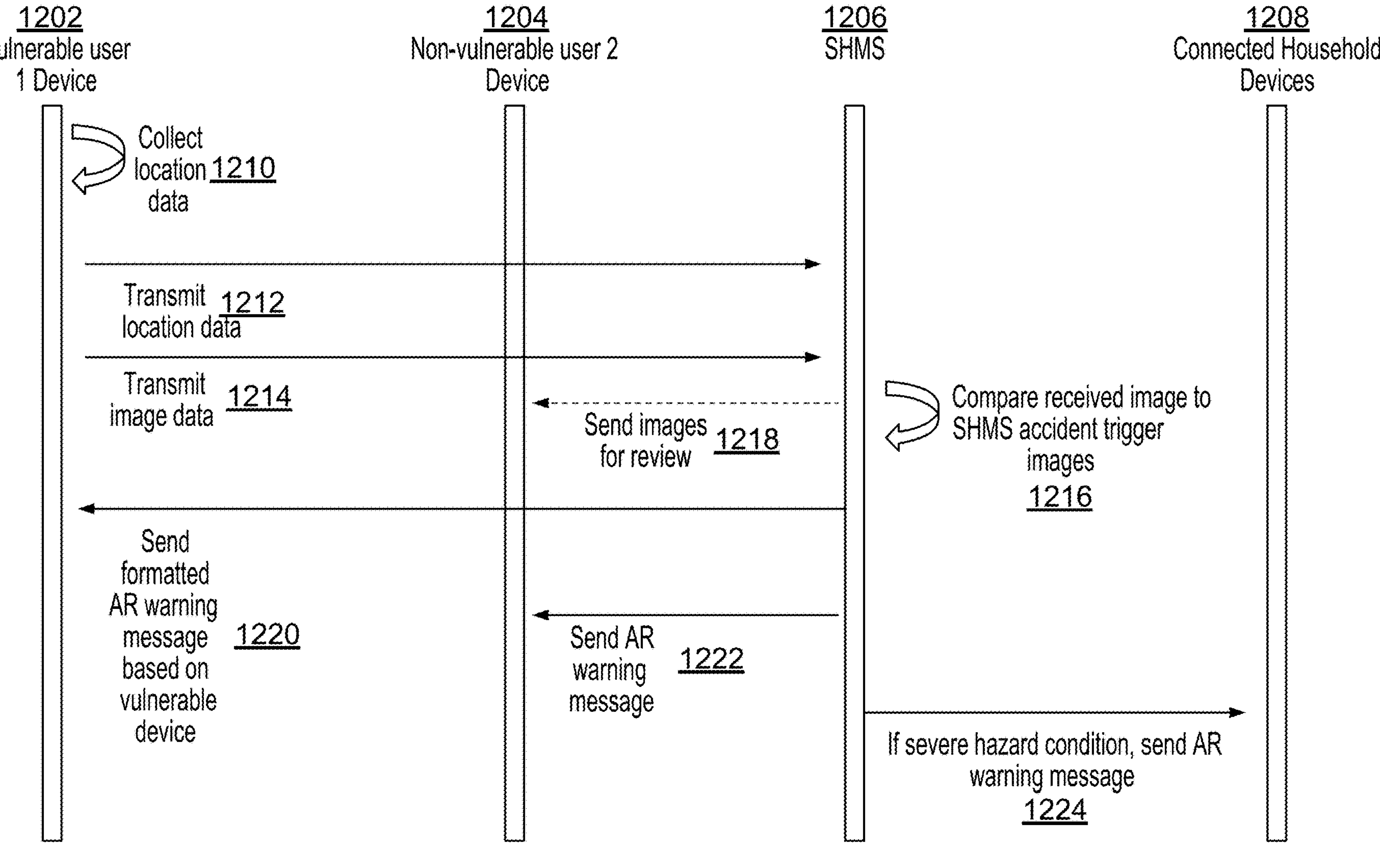
FIG. 12 is a flowchart of a detailed illustrative process for providing to a user an augmented reality scene associated with a potentially hazardous condition and associated with an object, in accordance with some embodiments of this disclosure.

FIG. 12 is a flowchart of a detailed illustrative process for providing to a user an augmented reality scene associated with a potentially hazardous condition and associated with an identified object, in accordance with some embodiments of this disclosure. In various embodiments, the individual steps of process 1200 may be implemented by one or more components of the devices and systems of FIGS. 1-10. Although the present disclosure may describe certain steps of process 1300 (and of other processes described herein) as being implemented by certain components of the devices and systems of FIGS. 1-10, this is for purposes of illustration only, and it should be understood that other components of the devices and systems of FIGS. 1-10 may implement those steps instead.

At 1210, a user device 1202 (e.g., a wearable camera or any other suitable device) of a vulnerable human (e.g., toddler 204 of FIG. 2) may collect location data, e.g., using any suitable technique, such as, for example, GPS techniques, VPS techniques, analyzing wireless signal characteristics, determining that a voice command was received from the user at a voice assistant in a particular room, or any other suitable technique or any combination thereof. At 1212, user device 1202 may transmit the location data to the SHMS 1206, e.g., being executed at any suitable user device in the environment, networking equipment, one or more remote servers, or at any other suitable device or any combination thereof.

At 1214, user device 1202 may transmit image data to SHMS 1206. The image data may depict a potentially hazardous object, and images may be continuously captured or selectively captured upon detecting an object. In some embodiments, detecting an object may comprise utilizing one or more techniques for object recognition such as, for example, image processing, edge detection, color pattern recognition, partial linear filtering, regression algorithms, and neural network pattern recognition, or any other suitable technique, or any combination thereof.

At 1216, SHMS 1206 may compare the received image to SHMS accident trigger images. For example, SHMS may reference a data structure (e.g., one or more of the data structures described in connection with FIGS. 4-6) storing images of objects and corresponding actions to be taken. In some embodiments, the SHMS may extract features from the received image and compare the extracted features to those of the stored images, and/or compare location data received from the user device with the corresponding location of the stored objects.

At 1218, SHMS 1206 may transmit images to a user device 1204 (e.g., device 116 of FIG. 2) of a non-vulnerable user for his or her review. The non-vulnerable user may be provided an option to indicate that the scenario of the vulnerable user is not a potentially hazardous condition, and/or provide a voice command to the vulnerable user. At 1220, the SHMS may send a formatted augmented reality warning message to user device 1202 of the vulnerable user. The augmented reality warning message may provide instructions to stop interacting with and/or move away from the potentially hazardous object, and may depict a demonstration of an injury that may occur if the vulnerable user does not do so.

At 1222, the SHMS may additionally send the formatted augmented reality warning message to user device 1204 of the non-vulnerable user. In some embodiments, the non-vulnerable user may be permitted to provide a voice command to the vulnerable user to stop interacting with and/or move away from the potentially hazardous object. At 1224, in a high severity hazard scenario, the SHMS may additionally or alternatively take control of other connected devices in the environment having display and/or audio and/or haptic capabilities to enhance the warning, e.g., transmitting the audio warning via wireless or wired speakers, sound bars, smart assistant devices or any other suitable device or combination thereof, or pausing video sessions on display (connected TV, phone, tablet or any other suitable device or combination thereof) to broadcast the warning to a broader reach of users.

Figure 13:
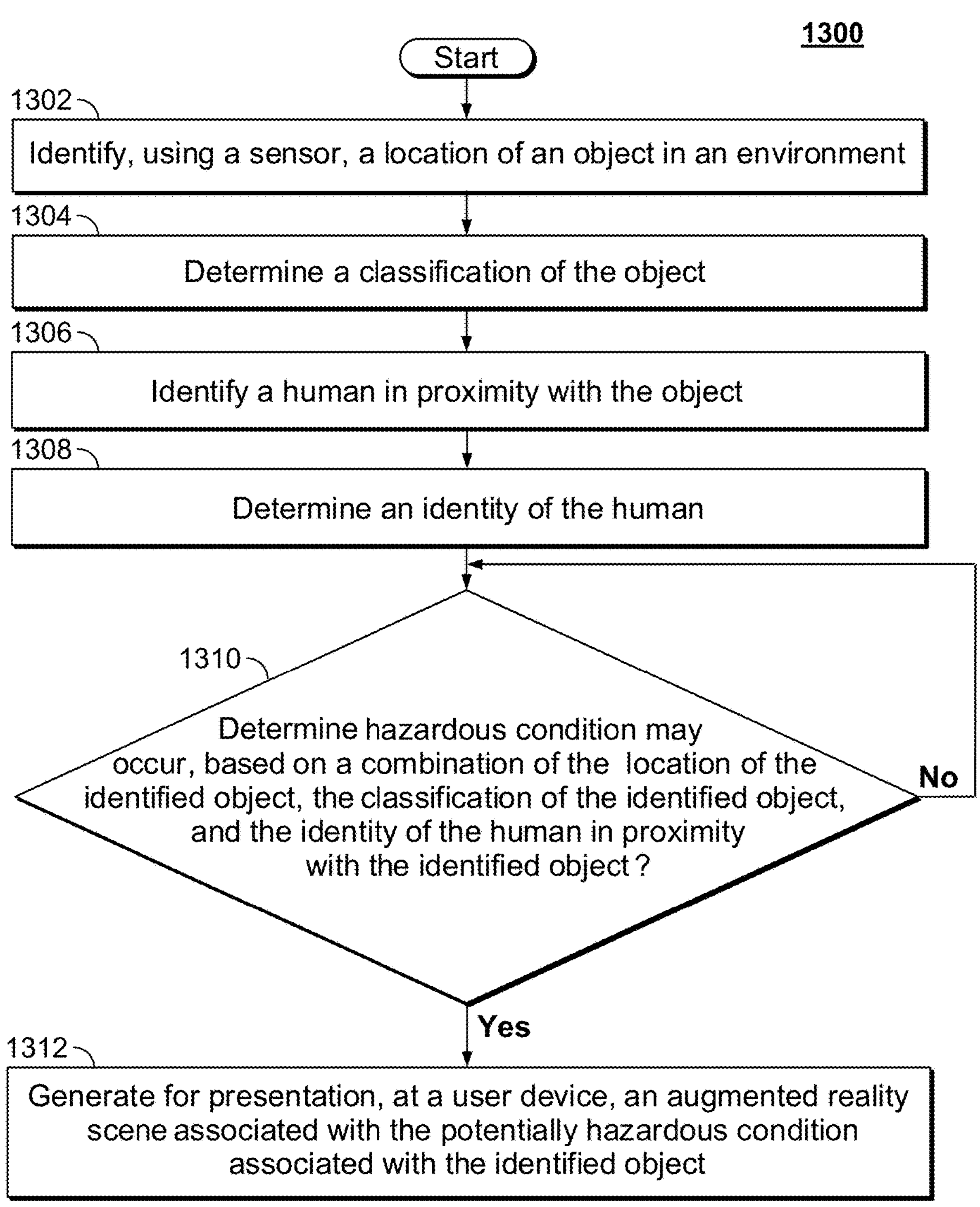
FIG. 13 is a flowchart of a detailed illustrative process for providing to a user an augmented reality scene associated with a potentially hazardous condition and associated with an object, in accordance with some embodiments of this disclosure.

FIG. 13 is a flowchart of a detailed illustrative process for providing to a user an augmented reality scene associated with a potentially hazardous condition and associated with an object, in accordance with some embodiments of this disclosure. In various embodiments, the individual steps of process 1300 may be implemented by one or more components of the devices and systems of FIGS. 1-10. Although the present disclosure may describe certain steps of process 1300 (and of other processes described herein) as being implemented by certain components of the devices and systems of FIGS. 1-10, this is for purposes of illustration only, and it should be understood that other components of the devices and systems of FIGS. 1-10 may implement those steps instead.

At 1302, the SHMS may identify, using a sensor, a location of an object in an environment. For example, user 102 of FIG. 1 may utilize one or more of user device 104, 105, 106 to scan his or her surroundings in environment 100, e.g., the home of user 102, and capture images of one or more objects in environment 100, which may be used to determine object locations within the environment. In some embodiments, wireless signal characteristics may be used to identify locations of objects in environment 100. The SHMS may generate a 3D map of environment 100 specifying locations of objects and/or locations of users in environment 100. In some embodiments, the user may be requested by the SHMS to scan his or her surroundings in environment 100, e.g., during a home inspection or at any other suitable time.

At 1304, the SHMS may determine a classification of an object. For example, the SHMS may determine that object 120 is a puddle, using any suitable technique, e.g., image processing techniques, machine learning classification techniques, or any combination thereof, or any other suitable technique. In some embodiments, the SHMS may determine a classification for object 120 based on received user input, e.g., marking or tagging a specific object and associated location in the environment.

At 1306, the SHMS may identify a human in proximity with the object. For example, the SHMS may determine that a camera feed of a user device of a user is currently capturing an image of the object. In some embodiments, the object may be an IoT device that communicates with the SHMS to indicate that a user is in proximity to the object, e.g., based on wireless communication with a nearby user device that is typically carried or worn by a user. In some embodiments, the SHMS may determine that the identified human in proximity to an object is a guest, if the SHMS is otherwise unable to locate a user profile for the identified human or determine an identity of the human.

At 1308, the SHMS may determine an identity of the human. For example, one or more of user devices 104, 105, 106 may be associated with a user profile for user 102, e.g., as indicated in data structure 400 of FIG. 4, and the SHMS may compare a current location of the user device to the stored location of the object to determine whether a user device of user 102 is proximate with the object. In some embodiments, sensors external to the user device, e.g., a security camera or a microphone or any other suitable sensor or combination thereof, may be used to identify a human in proximity with the object and/or determine an identity of the human. For example, the SHMS may store an image of user 102, and compare an image of a user in proximity to object 120 to the stored image of the user to determine whether there is a match.

At 1310, the SHMS may determine whether a hazardous condition may occur, based on a combination of the location of the object, the classification of the object, and the identity of the human in proximity with the object. In some embodiments, a subset of these factors, and/or any other additional suitable factors, may be taken into consideration by the SHMS in making this determination. For example, the SHMS may determine that identified puddle 120 constitutes a potentially hazardous condition, e.g., by referencing data structure 500 of FIG. 5. In some embodiments, the SHMS may determine that identified puddle 120 constitutes a potentially hazardous condition using machine learning model 800 as discussed in connection with FIG. 8. In some embodiments, the SHMS may take into account if a weather-related event is associated with environment 100 (e.g., whether a tornado or other weather-related environmental event is occurring or is imminent or is otherwise forecasted to occur), in determining whether a hazardous condition exists.

In some embodiments, the SHMS may reference a user profile associated with the identified user, and determine one or more short-term characteristics (e.g., stress level, tiredness level, etc.) and/or long-term characteristics (e.g., age, historical preferences, cognitive and/or physical capabilities or limitations such as, for example, literacy language(s) understood, hearing or vision impairments, mobility issues, etc.) to determine whether the user is a vulnerable user. In some circumstances, a potentially hazardous scenario may be of a high severity level such that a warning may be provided to the user regardless of whether the user is determined be a vulnerable user. In other circumstances, whether to provide the warning, and/or a manner of providing the warning, may be determined based on whether the user is a vulnerable user. In some embodiments, a guest may be treated as a vulnerable user by the SHMS, or may be treated in accordance with an age determined based on an appearance of the guest.

At 1312, the SHMS may generate for presentation, at a user device (e.g., one or more of user device 104, 105, 106 of user 102 of FIG. 1), an augmented reality scene (e.g., an augmented reality scene comprising indication 110 of FIG. 1) associated with the potentially hazardous condition (e.g., slip and fall) associated with the object (e.g., puddle 120). For example, indication 110 on smart glasses 105 may from the perspective of the user with puddle 120 in his or her field of view, be overlaid on or proximate to puddle 120. In some embodiments, if user 102 is considered to be a vulnerable user or a guest, one or more non-vulnerable users determined to be present in environment 100 may receive the augmented reality scene and/or other notifications regarding the potentially hazardous condition. In some embodiments, a notification or warning may be provided to user 102 or any other suitable user on the basis of two objects being close together, e.g., puddle 120 and television 116 of FIG. 1, even if no users are determined to be proximate to object 120 or object 116.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

identifying, using a wearable sensor being worn by a human, an object in an indoor environment, wherein the object is not the human;

determining that a hazardous condition for the human may occur based at least in part on the object being in the indoor environment; and based at least in part on determining that the hazardous condition for the human may occur:

identifying a physical mitigating object that is not present in the indoor environment by determining that the physical mitigating object, if present in the indoor environment, would decrease a risk of the hazardous condition occurring for the human; and generating for presentation, at a user device associated with the human, an augmented reality (AR) scene that comprises an AR overlay, over the indoor environment, of:

an indication of the hazardous condition; and a recommendation for use of the physical mitigating object to decrease the risk of the hazardous condition occurring for the human, wherein the recommendation comprises (a) an identification of the physical mitigating object, and (b) instructions on how the physical mitigating object is to be physically positioned to decrease the risk of the hazardous condition occurring for the human.

2. The method of claim 1, wherein:

the human is a first person; and the AR scene is generated for presentation to a second person.

3. The method of claim 2, wherein:

the indoor environment comprises a first room and a second room that is distinct from the first room;

determining that the hazardous condition may occur is further based on the object and the first person being in the first room; and the AR scene is generated for presentation, at the user device, to the second person in the second room.

4. The method of claim 1, further comprising:

determining whether the human is a vulnerable user; and determining that the hazardous condition may occur is further based on determining the human is a vulnerable user.

5. The method of claim 1, wherein determining that the hazardous condition may occur further comprises:

determining that the object is in proximity to an additional object; and determining that a database stores an indication that the object being in proximity to the additional object is indicative that the hazardous condition may occur, wherein neither the object nor the additional object is a human.

6. The method of claim 1, further comprising:

receiving input to mark an object as being associated with a potentially hazardous condition; and causing a database to store an indication that the marked object is associated with the potentially hazardous condition.

7. The method of claim 1, further comprising:

generating a plurality of user profiles, wherein a user profile of the plurality of the user profiles is associated with the user device;

determining a current location in the indoor environment of the user device, wherein the user profile is associated with the human; and determining that the current location in the indoor environment of the user device is proximate to the object in the indoor environment.

8. The method of claim 7, wherein generating for presentation, at the user device, the AR scene further comprises:

activating a camera of the user device based at least in part on determining that the current location in the indoor environment of the user device is proximate to the object in the indoor environment; and capturing, using the camera, an image of the object, and enhancing the image of the object with an augmented reality effect to generate the AR scene.

9. The method of claim 1, wherein:

the object in the indoor environment is intended to be (i) in the indoor environment and (ii) interacted with by the human; and determining that the hazardous condition for the human may occur is further based on the object being intended to be interacted with by the human.

10. The method of claim 1, wherein the AR scene further comprises at least one of installation instructions for the mitigating object or purchase information for the mitigating object.

11. The method of claim 1, wherein the mitigating object is configured to decrease the risk of the hazardous condition occurring by contacting and supporting at least a portion of the body of the human when the human is interacting with the object.

12. The method of claim 1, wherein the mitigating object is configured to decrease the risk of the hazardous condition occurring by attaching to the object in the indoor environment.

13. The method of claim 1, wherein the instructions comprise textual directions on how to physically position the mitigating object.

14. The method of claim 1, wherein the AR overlay further comprises an AR scene depicting a potential occurrence of the hazardous condition in the physical mitigating object is not physically placed in the indoor environment according to the recommendation.

15. The method of claim 1, wherein the recommendation further comprises an option to purchase the physical mitigating object.

16. The method of claim 1, wherein the instructions further comprise a depiction of how to physically position the physical mitigating object, the depiction comprising at least one of an image or a video.

17. A system comprising:

a wearable sensor; and control circuitry configured to:

identify, using the wearable sensor, being worn by a human, an object in an indoor environment, wherein the object is not the human;

determine that a hazardous condition for the human may occur based at least in part on the object being in the indoor environment; and based at least in part on determining that the hazardous condition for the human may occur:

identify a physical mitigating object that is not present in the indoor environment by determining that the physical mitigating object, if present in the indoor environment, would decrease a risk of the hazardous condition occurring for the human; and generate for presentation, at a user device associated with the human, an augmented reality (AR) scene that comprises an AR overlay, over the indoor environment, of:

as indication of the hazardous condition; and a recommendation for use of the physical mitigating object to decrease the risk of the hazardous condition occurring for the human, wherein the recommendation comprises (a) an identification of the physical mitigating object, and (b) instructions on how the physical mitigating object is to be physically positioned to decrease the risk of the hazardous condition occurring for the human.

18. The system of claim 17, wherein:

the human is a first person;

the AR scene is generated for presentation to a second person;

the indoor environment comprises a first room and a second room that is distinct from the first room;

determining that the hazardous condition may occur is further based on the object and the first person being in the first room; and the AR scene is generated for presentation, at the user device, to the second person in the second room.

19. The system of claim 17, wherein the control circuitry is configured to determine that the hazardous condition may occur by:

determining that the object is in proximity to an additional object; and determining that a database stores an indication that the object being in proximity to the additional object is indicative that the hazardous condition may occur, wherein neither the object nor the additional object is a human.

20. The system of claim 17, wherein the control circuitry is configured to:

receive input to mark an object as being associated with a potentially hazardous condition; and cause a database to store an indication that the marked object is associated with the potentially hazardous condition.

* * * * *